(12) United States Patent
Kosaka

(10) Patent No.: US 8,948,642 B2
(45) Date of Patent: Feb. 3, 2015

(54) HIGH-VOLTAGE POWER-SUPPLY APPARATUS, AND IMAGE FORMATION APPARATUS

(75) Inventor: Toru Kosaka, Tokyo (JP)

(73) Assignee: Oki Data Corporation, Tokyo (JP)

(*) Notice: Subject to any disclaimer, the term of this patent is extended or adjusted under 35 U.S.C. 154(b) by 218 days.

(21) Appl. No.: 13/584,891

(22) Filed: Aug. 14, 2012

(65) Prior Publication Data
US 2013/0045023 A1 Feb. 21, 2013

(30) Foreign Application Priority Data
Aug. 18, 2011 (JP) .................. 2011-179046

(51) Int. Cl.
G03G 15/00 (2006.01)
H02M 3/335 (2006.01)
(52) U.S. Cl.
CPC ........... *G03G 15/80* (2013.01); *H02M 3/33515* (2013.01); *Y02B 70/1433* (2013.01)
USPC .......................................................... 399/81
(58) Field of Classification Search
CPC .......................... G03G 15/80; G03G 15/5001
USPC .......................................................... 399/81
See application file for complete search history.

(56) References Cited

FOREIGN PATENT DOCUMENTS

| JP | H11-122914 A | 4/1999 |
|---|---|---|
| JP | 11-252905 A | 9/1999 |
| JP | 2001-054280 A | 2/2001 |
| JP | 2011-050187 A | 3/2011 |

*Primary Examiner* — David Bolduc
*Assistant Examiner* — Barnabas Fekete
(74) *Attorney, Agent, or Firm* — Marvin A. Motsenbocker; Mots Law, PLLC

(57) ABSTRACT

A high-voltage power-supply apparatus comprises a controller configured to output a control signal containing a pulse with a variable drive frequency; a switching unit configured to be switched by the control signal and output a drive signal; a piezoelectric transducer having a predetermined resonant frequency, and configured to be driven by the drive signal and output a high-voltage output voltage; a current detector configured to detect an electric current of a load connected to an output side of the piezoelectric transducer and output a current-detection result; and a lower-limit-value setup unit configured to set a frequency lower limit value for the drive frequency of the controller. The controller is configured to vary the frequency lower limit value in accordance with the current-detection result.

14 Claims, 29 Drawing Sheets

IMAGE FORMATION APPARATUS OF EMBODIMENT 1

FIG. 7

INPUT VALUES INTO AND OUTPUT VALUES FROM
TABLE REGISTER 83-1 SHOWN IN FIG. 5

| 5-BIT INPUT VALUE | 8-BIT OUTPUT VALUE |
|---|---|
| 00hex | 80hex |
| 01hex | 80hex |
| 02hex | 80hex |
| 03hex | 70hex |
| 04hex | 60hex |
| 05hex | 50hex |
| 06hex | 40hex |
| 07hex | 30hex |
| 08hex | 28hex |
| 09hex | 20hex |
| 0Ahex | 18hex |
| 0Bhex | 10hex |
| 0Chex | 0Chex |
| 0Dhex | 08hex |
| 0Ehex | 04hex |
| 0Fhex | 02hex |
| 10hex | 01hex |
| 11hex | 04hex |
| 12hex | 08hex |
| 13hex | 0Chex |
| 14hex | 10hex |
| 15hex | 18hex |
| 16hex | 20hex |
| 17hex | 28hex |
| 18hex | 30hex |
| 19hex | 40hex |
| 1Ahex | 50hex |
| 1Bhex | 60hex |
| 1Chex | 70hex |
| 1Dhex | 80hex |
| 1Ehex | 80hex |
| 1Fhex | 80hex |

FIG. 8

INPUT VALUES INTO AND OUTPUT VALUES FROM TABLE REGISTER 83-2 SHOWN IN FIG. 5

| 6-BIT INPUT VALUE | 8-BIT OUTPUT VALUE | INTEGER PORTION OF FREQUENCY DIVISION RATIO | 6-BIT INPUT VALUE | 8-BIT OUTPUT VALUE | INTEGER PORTION OF FREQUENCY DIVISION RATIO |
|---|---|---|---|---|---|
| 00hex | 80hex | 180-181hex | 20hex | 02hex | 1C0-1C1hex |
| 01hex | 7Chex | 182-183hex | 21hex | 01hex | 1C2-1C3hex |
| 02hex | 78hex | 184-185hex | 22hex | 01hex | 1C4-1C5hex |
| 03hex | 74hex | 186-187hex | 23hex | 01hex | 1C6-1C7hex |
| 04hex | 70hex | 188-189hex | 24hex | 01hex | 1C8-1C9hex |
| 05hex | 6Chex | 18A-18Bhex | 25hex | 01hex | 1CA-1CBhex |
| 06hex | 68hex | 18C-18Dhex | 26hex | 01hex | 1CC-1CDhex |
| 07hex | 64hex | 18E-18Fhex | 27hex | 01hex | 1CE-1CFhex |
| 08hex | 60hex | 190-193hex | 28hex | 01hex | 1D0-1D1hex |
| 09hex | 5Chex | 192-191hex | 29hex | 01hex | 1D2-1D3hex |
| 0Ahex | 58hex | 194-195hex | 2Ahex | 01hex | 1D4-1D5hex |
| 0Bhex | 54hex | 196-197hex | 2Bhex | 01hex | 1D6-1D7hex |
| 0Chex | 50hex | 198-199hex | 2Chex | 01hex | 1D8-1D9hex |
| 0Dhex | 4Chex | 19A-19Bhex | 2Dhex | 01hex | 1DA-1DBhex |
| 0Ehex | 48hex | 19C-19Dhex | 2Ehex | 01hex | 1DC-1DDhex |
| 0Fhex | 44hex | 19E-19Fhex | 2Fhex | 01hex | 1DE-1DFhex |
| 10hex | 40hex | 1A0-1A1hex | 30hex | 01hex | 1E0-1E1hex |
| 11hex | 3Chex | 1A2-1A3hex | 31hex | 01hex | 1E2-1E3hex |
| 12hex | 38hex | 1A4-1A5hex | 32hex | 01hex | 1E4-1E5hex |
| 13hex | 34hex | 1A6-1A7hex | 33hex | 01hex | 1E6-1E7hex |
| 14hex | 30hex | 1A8-1A9hex | 34hex | 01hex | 1E8-1E9hex |
| 15hex | 2Chex | 1AA-1ABhex | 35hex | 01hex | 1EA-1EBhex |
| 16hex | 28hex | 1AC-1ADhex | 36hex | 01hex | 1EC-1EDhex |
| 17hex | 24hex | 1AE-1AFhex | 37hex | 01hex | 1EE-1EFhex |
| 18hex | 20hex | 1B0-1B1hex | 38hex | 01hex | 1F0-1F1hex |
| 19hex | 1Chex | 1B2-1B3hex | 39hex | 01hex | 1F2-1F3hex |
| 1Ahex | 18hex | 1B4-1B5hex | 3Ahex | 01hex | 1F4-1F5hex |
| 1Bhex | 14hex | 1B6-1B7hex | 3Bhex | 01hex | 1F6-1F7hex |
| 1Chex | 10hex | 1B8-1B9hex | 3Chex | 01hex | 1F8-1F9hex |
| 1Dhex | 0Ehex | 1BA-1BBhex | 3Dhex | 01hex | 1FA-1FBhex |
| 1Ehex | 0Chex | 1BC-1BDhex | 3Ehex | 01hex | 1FC-1FDhex |
| 1Fhex | 03hex | 1BE-1BFhex | 3Fhex | 01hex | 1FE-1FFhex |

FIG. 9-1

INPUT VALUES INTO AND OUTPUT VALUES FROM
COUNTER UPPER-LIMIT-VALUE TABLE 91 SHOWN IN FIG. 5

| 8-BIT INPUT VALUE | 19-BIT OUTPUT VALUE | 8-BIT INPUT VALUE | 19-BIT OUTPUT VALUE | 8-BIT INPUT VALUE | 19-BIT OUTPUT VALUE | 8-BIT INPUT VALUE | 19-BIT OUTPUT VALUE |
|---|---|---|---|---|---|---|---|
| 00hex | 6E9E9hex | 20hex | 6E9E9hex | 40hex | 6EE12hex | 60hex | 6F3FEhex |
| 01hex | 6E9E9hex | 21hex | 6E9E9hex | 41hex | 6EE3Ahex | 61hex | 6F43Bhex |
| 02hex | 6E9E9hex | 22hex | 6E9E9hex | 42hex | 6EE63hex | 62hex | 6F477hex |
| 03hex | 6E9E9hex | 23hex | 6E9E9hex | 43hex | 6EE8Bhex | 63hex | 6F4B4hex |
| 04hex | 6E9E9hex | 24hex | 6E9FDhex | 44hex | 6EEB3hex | 64hex | 6F4DDhex |
| 05hex | 6E9E9hex | 25hex | 6EA25hex | 45hex | 6EEDBhex | 65hex | 6F51Ahex |
| 06hex | 6E9E9hex | 26hex | 6EA4Dhex | 46hex | 6EF04hex | 66hex | 6F557hex |
| 07hex | 6E9E9hex | 27hex | 6EA75hex | 47hex | 6EF2Chex | 67hex | 6F594hex |
| 08hex | 6E9E9hex | 28hex | 6EA89hex | 48hex | 6EF69hex | 68hex | 6F5D1hex |
| 09hex | 6E9E9hex | 29hex | 6EAB1hex | 49hex | 6EF91hex | 69hex | 6F60Ehex |
| 0Ahex | 6E9E9hex | 2Ahex | 6EADAhex | 4Ahex | 6EFB9hex | 6Ahex | 6F64Ahex |
| 0Bhex | 6E9E9hex | 2Bhex | 6EAEEhex | 4Bhex | 6EFE2hex | 6Bhex | 6F687hex |
| 0Chex | 6E9E9hex | 2Chex | 6EB16hex | 4Chex | 6F00Ahex | 6Chex | 6F6C5hex |
| 0Dhex | 6E9E9hex | 2Dhex | 6EB3Ehex | 4Dhex | 6F047hex | 6Dhex | 6F702hex |
| 0Ehex | 6E9E9hex | 2Ehex | 6EB66hex | 4Ehex | 6F06Fhex | 6Ehex | 6F73Fhex |
| 0Fhex | 6E9E9hex | 2Fhex | 6EB7Ahex | 4Fhex | 6F097hex | 6Fhex | 6F790hex |
| 10hex | 6E9E9hex | 30hex | 6EBA2hex | 50hex | 6F0D4hex | 70hex | 6F7CDhex |
| 11hex | 6E9E9hex | 31hex | 6EBCBhex | 51hex | 6F0FChex | 71hex | 6F80Ahex |
| 12hex | 6E9E9hex | 32hex | 6EBF3hex | 52hex | 6F125hex | 72hex | 6F847hex |
| 13hex | 6E9E9hex | 33hex | 6EC1Bhex | 53hex | 6F161hex | 73hex | 6F899hex |
| 14hex | 6E9E9hex | 34hex | 6EC43hex | 54hex | 6F18Ahex | 74hex | 6F8D6hex |
| 15hex | 6E9E9hex | 35hex | 6EC57hex | 55hex | 6F1C7hex | 75hex | 6F928hex |
| 16hex | 6E9E9hex | 36hex | 6EC7Fhex | 56hex | 6F1EFhex | 76hex | 6F965hex |
| 17hex | 6E9E9hex | 37hex | 6ECA8hex | 57hex | 6F22Chex | 77hex | 6F9B6hex |
| 18hex | 6E9E9hex | 38hex | 6ECD0hex | 58hex | 6F254hex | 78hex | 6F9F4hex |
| 19hex | 6E9E9hex | 39hex | 6ECF8hex | 59hex | 6F291hex | 79hex | 6FA45hex |
| 1Ahex | 6E9E9hex | 3Ahex | 6ED20hex | 5Ahex | 6F2B9hex | 7Ahex | 6FA83hex |
| 1Bhex | 6E9E9hex | 3Bhex | 6ED49hex | 5Bhex | 6F2F6hex | 7Bhex | 6FAD4hex |
| 1Chex | 6E9E9hex | 3Chex | 6ED71hex | 5Chex | 6F31Fhex | 7Chex | 6FB12hex |
| 1Dhex | 6E9E9hex | 3Dhex | 6ED99hex | 5Dhex | 6F35Chex | 7Dhex | 6FB63hex |
| 1Ehex | 6E9E9hex | 3Ehex | 6EDC1hex | 5Ehex | 6F398hex | 7Ehex | 6FBB5hex |
| 1Fhex | 6E9E9hex | 3Fhex | 6EDEAhex | 5Fhex | 6F3C1hex | 7Fhex | 6FC07hex |

FIG. 9-2

INPUT VALUES INTO AND OUTPUT VALUES FROM
COUNTER UPPER-LIMIT-VALUE TABLE 91 SHOWN IN FIG. 5

| 8-BIT INPUT VALUE | 19-BIT OUTPUT VALUE | 8-BIT INPUT VALUE | 19-BIT OUTPUT VALUE | 8-BIT INPUT VALUE | 19-BIT OUTPUT VALUE | 8-BIT INPUT VALUE | 19-BIT OUTPUT VALUE |
|---|---|---|---|---|---|---|---|
| 80hex | 6FC59hex | A0hex | 70788hex | C0hex | 71398hex | E0hex | 71FD1hex |
| 81hex | 6FC96hex | A1hex | 707DBhex | C1hex | 71401hex | E1hex | 7203Chex |
| 82hex | 6FCE8hex | A2hex | 70842hex | C2hex | 71455hex | E2hex | 720A6hex |
| 83hex | 6FD3Ahex | A3hex | 708AAhex | C3hex | 714BEhex | E3hex | 72111hex |
| 84hex | 6FD8Chex | A4hex | 708FDhex | C4hex | 71512hex | E4hex | 7217Bhex |
| 85hex | 6FDDEhex | A5hex | 70965hex | C5hex | 7157Bhex | E5hex | 721E6hex |
| 86hex | 6FE30hex | A6hex | 709CDhex | C6hex | 715CFhex | E6hex | 72251hex |
| 87hex | 6FE82hex | A7hex | 70A20hex | C7hex | 71639hex | E7hex | 722BBhex |
| 88hex | 6FED4hex | A8hex | 70A88hex | C8hex | 716A2hex | E8hex | 7233Chex |
| 89hex | 6FF3Bhex | A9hex | 70AF0hex | C9hex | 716F6hex | E9hex | 723A7hex |
| 8Ahex | 6FF8Dhex | AAhex | 70B43hex | CAhex | 71760hex | EAhex | 72411hex |
| 8Bhex | 6FFDFhex | ABhex | 70BABhex | CBhex | 717B4hex | EBhex | 72492hex |
| 8Chex | 70031hex | AChex | 70C13hex | CChex | 7181Ehex | EChex | 72512hex |
| 8Dhex | 70098hex | ADhex | 70C67hex | CDhex | 71872hex | EDhex | 7257Dhex |
| 8Ehex | 700EBhex | AEhex | 70CCFhex | CEhex | 718DChex | EEhex | 725FEhex |
| 8Fhex | 7013Dhex | AFhex | 70D37hex | CFhex | 71930hex | EFhex | 7267Ehex |
| 90hex | 701A4hex | B0hex | 70D8Bhex | D0hex | 7199Ahex | F0hex | 72715hex |
| 91hex | 701F6hex | B1hex | 70DF3hex | D1hex | 71A04hex | F1hex | 72795hex |
| 92hex | 7025Dhex | B2hex | 70E5Bhex | D2hex | 71A58hex | F2hex | 7282Chex |
| 93hex | 702B0hex | B3hex | 70EAFhex | D3hex | 71AC2hex | F3hex | 728C2hex |
| 94hex | 70302hex | B4hex | 70F17hex | D4hex | 71B17hex | F4hex | 72959hex |
| 95hex | 70369hex | B5hex | 70F80hex | D5hex | 71B81hex | F5hex | 729EFhex |
| 96hex | 703D0hex | B6hex | 70FD3hex | D6hex | 71BEBhex | F6hex | 72AB1hex |
| 97hex | 70423hex | B7hex | 7103Chex | D7hex | 71C40hex | F7hex | 72B73hex |
| 98hex | 7048Ahex | B8hex | 71090hex | D8hex | 71CAAhex | F8hex | 72C35hex |
| 99hex | 704DDhex | B9hex | 710F8hex | D9hex | 71D14hex | F9hex | 72D38hex |
| 9Ahex | 70544hex | BAhex | 71161hex | DAhex | 71D69hex | FAhex | 72E67hex |
| 9Bhex | 70597hex | BBhex | 711B5hex | DBhex | 71DD3hex | FBhex | 73351hex |
| 9Chex | 705FEhex | BChex | 7121Ehex | DChex | 71E3Dhex | FChex | 73351hex |
| 9Dhex | 70666hex | BDhex | 71272hex | DDhex | 71EA7hex | FDhex | 73351hex |
| 9Ehex | 706B9hex | BEhex | 712DBhex | DEhex | 71EFChex | FEhex | 73351hex |
| 9Fhex | 70720hex | BFhex | 71344hex | DFhex | 71F67hex | FFhex | 73351hex |

FIG. 10-1

COUNTER UPPER-LIMIT-VALUE TABLE 91 SHOWN IN FIG. 5

| CURRENT | FREQUENCY | CURRENT | FREQUENCY | CURRENT | FREQUENCY | CURRENT | FREQUENCY |
|---|---|---|---|---|---|---|---|
| 0 μA | 113.00kHz | 32 μA | 113.00kHz | 64 μA | 112.74kHz | 96 μA | 112.36kHz |
| 1 μA | 113.00kHz | 33 μA | 113.00kHz | 65 μA | 112.73kHz | 97 μA | 112.35kHz |
| 2 μA | 113.00kHz | 34 μA | 113.00kHz | 66 μA | 112.72kHz | 98 μA | 112.33kHz |
| 3 μA | 113.00kHz | 35 μA | 113.00kHz | 67 μA | 112.71kHz | 99 μA | 112.32kHz |
| 4 μA | 113.00kHz | 36 μA | 113.00kHz | 68 μA | 112.70kHz | 100 μA | 112.31kHz |
| 5 μA | 113.00kHz | 37 μA | 112.99kHz | 69 μA | 112.69kHz | 101 μA | 112.29kHz |
| 6 μA | 113.00kHz | 38 μA | 112.98kHz | 70 μA | 112.68kHz | 102 μA | 112.28kHz |
| 7 μA | 113.00kHz | 39 μA | 112.97kHz | 71 μA | 112.67kHz | 103 μA | 112.26kHz |
| 8 μA | 113.00kHz | 40 μA | 112.96kHz | 72 μA | 112.65kHz | 104 μA | 112.25kHz |
| 9 μA | 113.00kHz | 41 μA | 112.95kHz | 73 μA | 112.64kHz | 105 μA | 112.23kHz |
| 10 μA | 113.00kHz | 42 μA | 112.94kHz | 74 μA | 112.63kHz | 106 μA | 112.22kHz |
| 11 μA | 113.00kHz | 43 μA | 112.94kHz | 75 μA | 112.62kHz | 107 μA | 112.20kHz |
| 12 μA | 113.00kHz | 44 μA | 112.93kHz | 76 μA | 112.61kHz | 108 μA | 112.19kHz |
| 13 μA | 113.00kHz | 45 μA | 112.92kHz | 77 μA | 112.60kHz | 109 μA | 112.17kHz |
| 14 μA | 113.00kHz | 46 μA | 112.91kHz | 78 μA | 112.59kHz | 110 μA | 112.16kHz |
| 15 μA | 113.00kHz | 47 μA | 112.90kHz | 79 μA | 112.58kHz | 111 μA | 112.14kHz |
| 16 μA | 113.00kHz | 48 μA | 112.89kHz | 80 μA | 112.56kHz | 112 μA | 112.12kHz |
| 17 μA | 113.00kHz | 49 μA | 112.88kHz | 81 μA | 112.55kHz | 113 μA | 112.11kHz |
| 18 μA | 113.00kHz | 50 μA | 112.87kHz | 82 μA | 112.54kHz | 114 μA | 111.09kHz |
| 19 μA | 113.00kHz | 51 μA | 112.86kHz | 83 μA | 112.53kHz | 115 μA | 112.07kHz |
| 20 μA | 113.00kHz | 52 μA | 112.85kHz | 84 μA | 112.52kHz | 116 μA | 112.06kHz |
| 21 μA | 113.00kHz | 53 μA | 112.85kHz | 85 μA | 112.50kHz | 117 μA | 112.04kHz |
| 22 μA | 113.00kHz | 54 μA | 112.84kHz | 86 μA | 112.49kHz | 118 μA | 112.02kHz |
| 23 μA | 113.00kHz | 55 μA | 112.83kHz | 87 μA | 112.48kHz | 119 μA | 112.00kHz |
| 24 μA | 113.00kHz | 56 μA | 112.82kHz | 88 μA | 112.47kHz | 120 μA | 111.99kHz |
| 25 μA | 113.00kHz | 57 μA | 112.81kHz | 89 μA | 112.45kHz | 121 μA | 111.97kHz |
| 26 μA | 113.00kHz | 58 μA | 112.80kHz | 90 μA | 112.44kHz | 122 μA | 111.95kHz |
| 27 μA | 113.00kHz | 59 μA | 112.79kHz | 91 μA | 112.43kHz | 123 μA | 111.93kHz |
| 28 μA | 113.00kHz | 60 μA | 112.78kHz | 92 μA | 112.42kHz | 124 μA | 111.92kHz |
| 29 μA | 113.00kHz | 61 μA | 112.77kHz | 93 μA | 112.40kHz | 125 μA | 111.90kHz |
| 30 μA | 113.00kHz | 62 μA | 112.76kHz | 94 μA | 112.39kHz | 126 μA | 111.88kHz |
| 31 μA | 113.00kHz | 63 μA | 112.75kHz | 95 μA | 112.38kHz | 127 μA | 111.86kHz |

FIG. 10-2

COUNTER UPPER-LIMIT-VALUE TABLE 91 SHOWN IN FIG. 5

| CURRENT | FREQUENCY | CURRENT | FREQUENCY | CURRENT | FREQUENCY | CURRENT | FREQUENCY |
|---|---|---|---|---|---|---|---|
| 128 μA | 111.84kHz | 160 μA | 111.14kHz | 192 μA | 110.40kHz | 224 μA | 109.66kHz |
| 129 μA | 111.82kHz | 161 μA | 111.12kHz | 193 μA | 110.38kHz | 225 μA | 109.64kHz |
| 130 μA | 111.80kHz | 162 μA | 111.10kHz | 194 μA | 110.36kHz | 226 μA | 109.61kHz |
| 131 μA | 111.78kHz | 163 μA | 111.07kHz | 195 μA | 110.33kHz | 227 μA | 109.59kHz |
| 132 μA | 111.76kHz | 164 μA | 111.05kHz | 196 μA | 110.31kHz | 228 μA | 109.56kHz |
| 133 μA | 111.74kHz | 165 μA | 111.03kHz | 197 μA | 110.29kHz | 229 μA | 109.54kHz |
| 134 μA | 111.72kHz | 166 μA | 111.00kHz | 198 μA | 110.27kHz | 230 μA | 109.51kHz |
| 135 μA | 111.70kHz | 167 μA | 110.98kHz | 199 μA | 110.24kHz | 231 μA | 109.49kHz |
| 136 μA | 111.68kHz | 168 μA | 110.96kHz | 200 μA | 110.22kHz | 232 μA | 109.46kHz |
| 137 μA | 111.66kHz | 169 μA | 110.93kHz | 201 μA | 110.20kHz | 233 μA | 109.43kHz |
| 138 μA | 111.64kHz | 170 μA | 110.91kHz | 202 μA | 110.17kHz | 234 μA | 109.41kHz |
| 139 μA | 111.62kHz | 171 μA | 110.89kHz | 203 μA | 110.15kHz | 235 μA | 109.38kHz |
| 140 μA | 111.60kHz | 172 μA | 110.86kHz | 204 μA | 110.13kHz | 236 μA | 109.35kHz |
| 141 μA | 111.57kHz | 173 μA | 110.84kHz | 205 μA | 110.11kHz | 237 μA | 109.32kHz |
| 142 μA | 111.55kHz | 174 μA | 110.82kHz | 206 μA | 110.08kHz | 238 μA | 109.29kHz |
| 143 μA | 111.53kHz | 175 μA | 110.79kHz | 207 μA | 110.06kHz | 239 μA | 109.26kHz |
| 144 μA | 111.51kHz | 176 μA | 110.77kHz | 208 μA | 110.04kHz | 240 μA | 109.23kHz |
| 145 μA | 111.49kHz | 177 μA | 110.75kHz | 209 μA | 110.01kHz | 241 μA | 109.20kHz |
| 146 μA | 111.46kHz | 178 μA | 110.72kHz | 210 μA | 109.99kHz | 242 μA | 109.16kHz |
| 147 μA | 111.44kHz | 179 μA | 110.70kHz | 211 μA | 109.97kHz | 243 μA | 109.13kHz |
| 148 μA | 111.42kHz | 180 μA | 110.68kHz | 212 μA | 109.95kHz | 244 μA | 109.09kHz |
| 149 μA | 111.40kHz | 181 μA | 110.65kHz | 213 μA | 109.92kHz | 245 μA | 109.06kHz |
| 150 μA | 111.37kHz | 182 μA | 110.63kHz | 214 μA | 109.90kHz | 246 μA | 109.01kHz |
| 151 μA | 111.35kHz | 183 μA | 110.61kHz | 215 μA | 109.88kHz | 247 μA | 108.97kHz |
| 152 μA | 111.33kHz | 184 μA | 110.59kHz | 216 μA | 109.85kHz | 248 μA | 108.92kHz |
| 153 μA | 111.31kHz | 185 μA | 110.56kHz | 217 μA | 109.83kHz | 249 μA | 108.86kHz |
| 154 μA | 111.28kHz | 186 μA | 110.54kHz | 218 μA | 109.81kHz | 250 μA | 108.79kHz |
| 155 μA | 111.26kHz | 187 μA | 110.52kHz | 219 μA | 109.78kHz | 251 μA | 108.5kHz |
| 156 μA | 111.24kHz | 188 μA | 110.49kHz | 220 μA | 109.76kHz | 252 μA | 108.5kHz |
| 157 μA | 111.21kHz | 189 μA | 110.47kHz | 221 μA | 109.73kHz | 253 μA | 108.5kHz |
| 158 μA | 111.19kHz | 190 μA | 110.45kHz | 222 μA | 109.71kHz | 254 μA | 108.5kHz |
| 159 μA | 111.17kHz | 191 μA | 110.42kHz | 223 μA | 109.69kHz | 255 μA | 108.5kHz |

FIG. 11  DRIVE FREQUENCIES AND CORRESPONDING VALUES OF DC OUTPUT VOLTAGE S75 IN HIGH-VOLTAGE POWER-SUPPLY APPARATUS 70 SHOWN IN FIG. 2

| FREQUENCY | NO LOAD | 20MΩ LOAD | 10MΩ LOAD | 5MΩ LOAD |
|---|---|---|---|---|
| 130.0kHz | -0.12kV | -0.11kV | -0.10kV | -0.09kV |
| 129.0kHz | -0.14kV | -0.12kV | -0.11kV | -0.09kV |
| 128.0kHz | -0.15kV | -0.13kV | -0.12kV | -0.10kV |
| 127.0kHz | -0.16kV | -0.14kV | -0.13kV | -0.11kV |
| 126.0kHz | -0.18kV | -0.16kV | -0.14kV | -0.12kV |
| 125.0kHz | -0.21kV | -0.18kV | -0.16kV | -0.14kV |
| 124.0kHz | -0.25kV | -0.21kV | -0.18kV | -0.15kV |
| 123.0kHz | -0.27kV | -0.23kV | -0.20kV | -0.16kV |
| 122.0kHz | -0.29kV | -0.25kV | -0.22kV | -0.18kV |
| 121.0kHz | -0.33kV | -0.29kV | -0.25kV | -0.20kV |
| 120.0kHz | -0.38kV | -0.33kV | -0.28kV | -0.22kV |
| 119.0kHz | -0.43kV | -0.38kV | -0.32kV | -0.25kV |
| 118.0kHz | -0.49kV | -0.42kV | -0.35kV | -0.27kV |
| 117.0kHz | -0.60kV | -0.51kV | -0.41kV | -0.31kV |
| 116.0kHz | -0.75kV | -0.62kV | -0.49kV | -0.36kV |
| 115.0kHz | -0.98kV | -0.79kV | -0.61kV | -0.43kV |
| 114.0kHz | -1.30kV | -0.99kV | -0.72kV | -0.49kV |
| 113.0kHz | -1.98kV | -1.38kV | -0.92kV | -0.60kV |
| 112.0kHz | -3.71kV | -2.02kV | -1.20kV | -0.73kV |
| 111.0kHz | -8.97kV | -3.12kV | -1.58kV | -0.89kV |
| 110.5kHz | -11.95kV | -3.55kV | -1.76kV | -0.97kV |
| 110.0kHz | -7.35kV | -3.51kV | -1.92kV | -1.07kV |
| 109.5kHz | -3.78kV | -3.06kV | -1.96kV | -1.16kV |
| 109.0kHz | -2.74kV | -2.53kV | -1.92kV | -1.22kV |
| 108.5kHz | -2.16kV | -2.10kV | -1.80kV | -1.26kV |
| 108.0kHz | -1.80kV | -1.78kV | -1.65kV | -1.27kV |
| 107.5kHz | -1.53kV | -1.49kV | -1.41kV | -1.24kV |
| 107.0kHz | -1.38kV | -1.36kV | -1.33kV | -1.17kV |
| 106.5kHz | -1.23kV | -1.22kV | -1.21kV | -1.12kV |
| 106.0kHz | -1.11kV | -1.10kV | -1.09kV | -1.06kV |
| 105.5kHz | -1.02kV | -1.00kV | -1.00kV | -0.98kV |
| 105.0kHz | -0.95kV | -0.92kV | -0.91kV | -0.89kV |
| 104.5kHz | -0.91kV | -0.88kV | -0.87kV | -0.85kV |
| 104.0kHz | -0.87kV | -0.83kV | -0.81kV | -0.79kV |
| 103.5kHz | -0.83kV | -0.78kV | -0.76kV | -0.73kV |
| 103.0kHz | -0.73kV | -0.70kV | -0.69kV | -0.68kV |
| 102.5kHz | -0.69kV | -0.67kV | -0.66kV | -0.65kV |
| 102.0kHz | -0.66kV | -0.64kV | -0.62kV | -0.61kV |
| 101.5kHz | -0.64kV | -0.61kV | -0.59kV | -0.58kV |
| 101.0kHz | -0.61kV | -0.57kV | -0.56kV | -0.54kV |
| 100.5kHz | -0.56kV | -0.53kV | -0.51kV | -0.50kV |
| 100.0kHz | -0.54kV | -0.50kV | -0.48kV | -0.48kV |

FIG. 12   ELECTRIC-CURRENT VALUES CORRESPONDING TO VALUES OF DC OUTPUT VOLTAGE S75 SHOWN IN FIG. 11

| FREQUENCY | 20MΩ LOAD | 10MΩ LOAD | 5MΩ LOAD |
|---|---|---|---|
| 130.0kHz | 6μA | 10μA | 18μA |
| 129.0kHz | 6μA | 11μA | 18μA |
| 128.0kHz | 7μA | 12μA | 20μA |
| 127.0kHz | 7μA | 13μA | 22μA |
| 126.0kHz | 8μA | 14μA | 24μA |
| 125.0kHz | 9μA | 16μA | 28μA |
| 124.0kHz | 11μA | 18μA | 30μA |
| 123.0kHz | 12μA | 20μA | 32μA |
| 122.0kHz | 13μA | 22μA | 36μA |
| 121.0kHz | 15μA | 25μA | 40μA |
| 120.0kHz | 17μA | 28μA | 44μA |
| 119.0kHz | 19μA | 32μA | 50μA |
| 118.0kHz | 21μA | 35μA | 54μA |
| 117.0kHz | 26μA | 41μA | 62μA |
| 116.0kHz | 31μA | 49μA | 72μA |
| 115.0kHz | 40μA | 61μA | 86μA |
| 114.0kHz | 50μA | 72μA | 98μA |
| 113.0kHz | 69μA | 92μA | 120μA |
| 112.0kHz | 101μA | 120μA | 146μA |
| 111.0kHz | 156μA | 158μA | 178μA |
| 110.5kHz | 178μA | 176μA | 194μA |
| 110.0kHz | 176μA | 192μA | 214μA |
| 109.5kHz | 153μA | 196μA | 232μA |
| 109.0kHz | 127μA | 192μA | 244μA |
| 108.5kHz | 105μA | 180μA | 252μA |
| 108.0kHz | 89μA | 165μA | 254μA |
| 107.5kHz | 75μA | 141μA | 248μA |
| 107.0kHz | 68μA | 133μA | 234μA |
| 106.5kHz | 61μA | 121μA | 224μA |
| 106.0kHz | 55μA | 109μA | 212μA |
| 105.5kHz | 50μA | 100μA | 196μA |
| 105.0kHz | 46μA | 91μA | 178μA |
| 104.5kHz | 44μA | 87μA | 170μA |
| 104.0kHz | 42μA | 81μA | 158μA |
| 103.5kHz | 39μA | 76μA | 146μA |
| 103.0kHz | 35μA | 69μA | 136μA |
| 102.5kHz | 34μA | 66μA | 130μA |
| 102.0kHz | 32μA | 62μA | 122μA |
| 101.5kHz | 31μA | 59μA | 116μA |
| 101.0kHz | 29μA | 56μA | 108μA |
| 100.5kHz | 27μA | 51μA | 100μA |
| 100.0kHz | 25μA | 48μA | 94μA |

FIG. 13

RELATIONS OF EACH OF VALUES OF DC OUTPUT
VOLTAGE S75 SHOWN IN FIG. 5

| DC OUTPUT VOLTAGE S75 | OUTPUT-VOLTAGE DETECTION SIGNAL S77 | DETECTION VALUE OF 12-BIT ADC 80 | 12-BIT INPUT VALUE INTO OPERATION UNIT 82-2 | 10-BIT INPUT VALUE INTO COMPARATOR 88 | CORRESPONDING 8-BIT TARGET VALUE (DATA) |
|---|---|---|---|---|---|
| 0V | 3.30V | FFFhex | 000hex | 000hex | 00hex |
| -100V | 3.16V | F51hex | 0AEhex | 02Bhex | 0Ahex |
| -200V | 3.02V | EA3hex | 15Chex | 057hex | 15hex |
| -300V | 2.89V | E02hex | 1FDhex | 07Fhex | 1Fhex |
| -400V | 2.75V | D54hex | 2ABhex | 0AAhex | 2Ahex |
| -500V | 2.61V | CA6hex | 359hex | 0D6hex | 35hex |
| -600V | 2.47V | BF9hex | 406hex | 101hex | 40hex |
| -700V | 2.34V | B57hex | 4A8hex | 12Ahex | 4Ahex |
| -800V | 2.20V | AAAhex | 555hex | 155hex | 55hex |
| -900V | 2.06V | 9FChex | 603hex | 180hex | 60hex |
| -1000V | 1.93V | 95Ahex | 6A5hex | 1A9hex | 6Ahex |
| -1100V | 1.79V | 8ADhex | 752hex | 1D4hex | 75hex |
| -1200V | 1.65V | 7FFhex | 800hex | 200hex | 80hex |
| -1300V | 1.52V | 75Ehex | 8A1hex | 228hex | 8Ahex |
| -1400V | 1.38V | 6B0hex | 94Fhex | 253hex | 94hex |
| -1500V | 1.24V | 602hex | 9FDhex | 27Fhex | 9Fhex |
| -1600V | 1.11V | 561hex | A9Ehex | 2A7hex | A9hex |
| -1700V | 0.97V | 4B3hex | B4Chex | 2D3hex | B4hex |
| -1800V | 0.83V | 405hex | BFAhex | 2FEhex | BFhex |
| -1900V | 0.70V | 364hex | C9Bhex | 326hex | C9hex |
| -2000V | 0.56V | 2B6hex | D49hex | 352hex | D4hex |
| -2100V | 0.42V | 209hex | DF6hex | 37Dhex | DFhex |
| -2200V | 0.29V | 167hex | E98hex | 3A6hex | E9hex |
| -2300V | 0.15V | 0BAhex | F45hex | 3D1hex | F4hex |
| -2400V | 0.01V | 00Chex | FF3hex | 3FChex | FFhex |

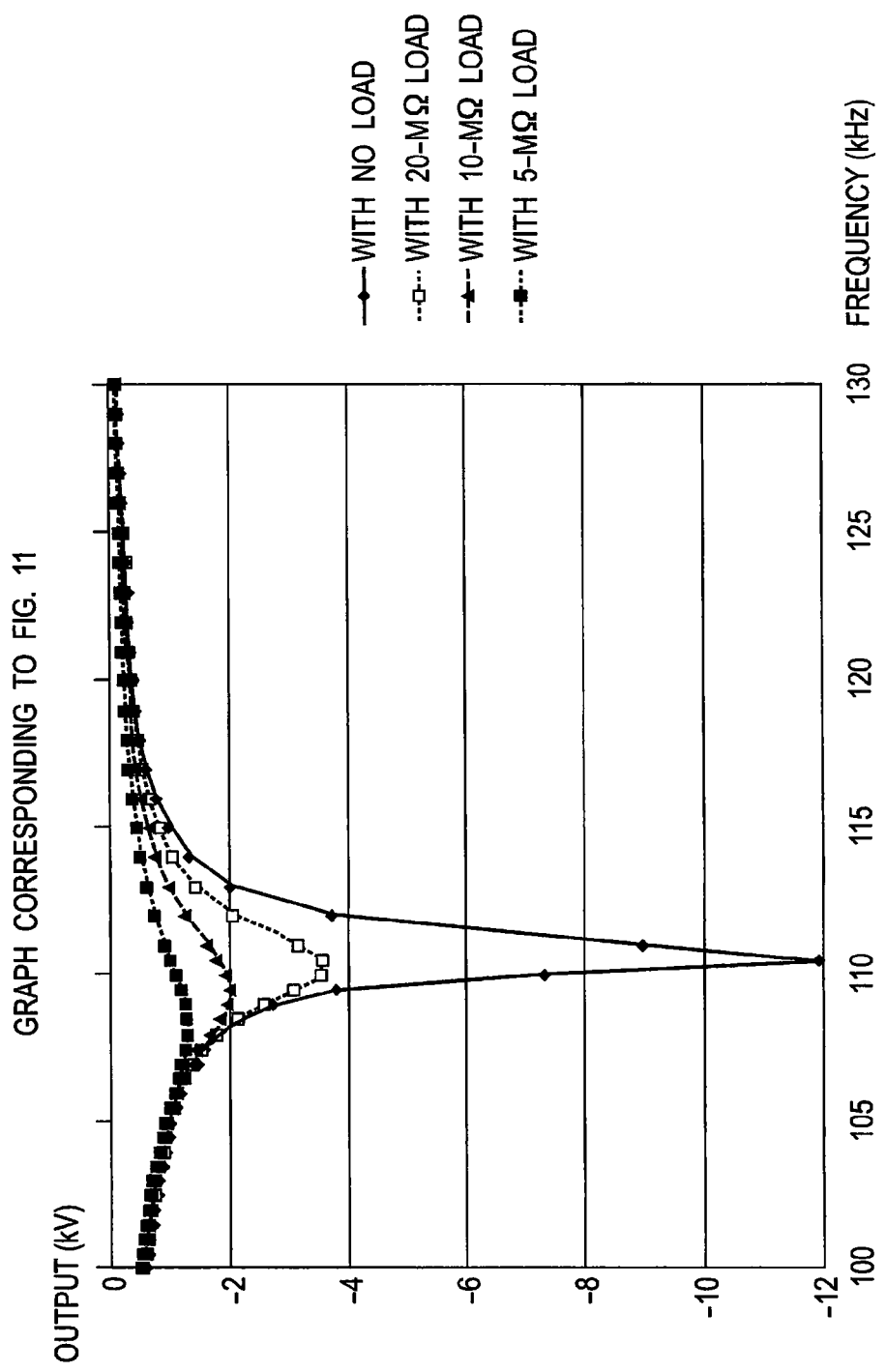

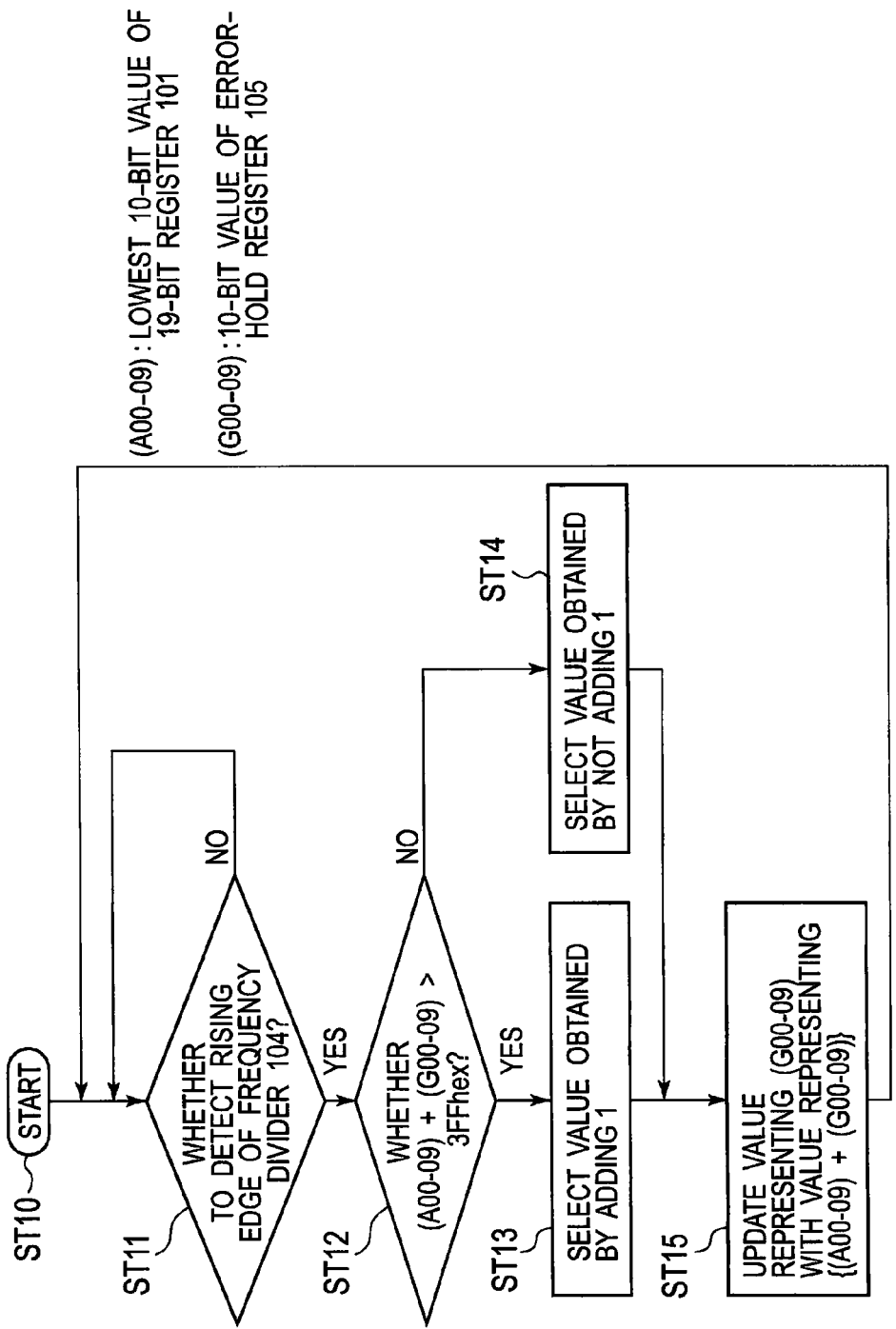

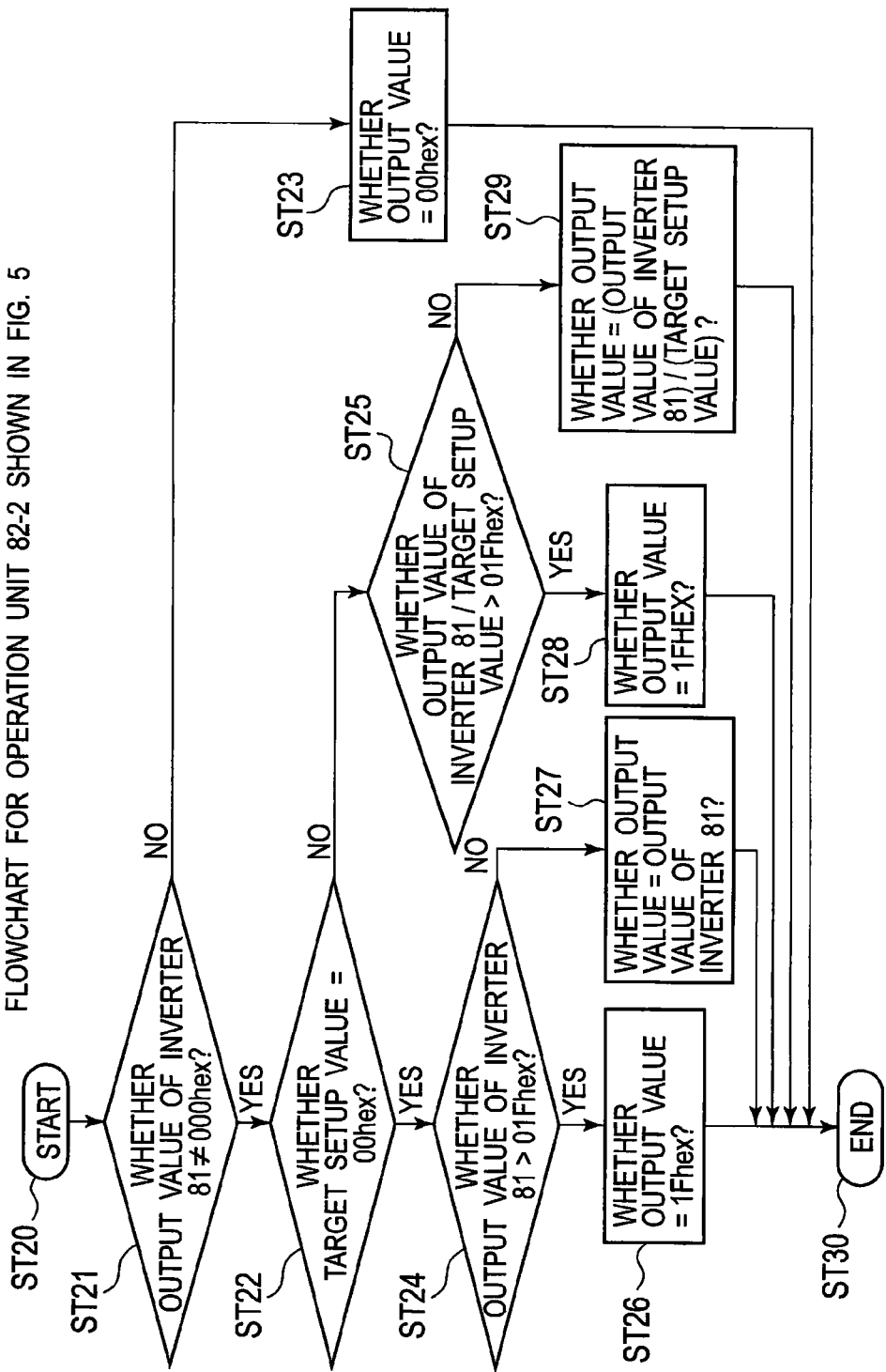

FIG. 17

RISING CHARACTERISTICS OF HIGH-VOLTAGE POWER-SUPPLY APPARATUS 70 SHOWN IN FIGS 1 AND 2

| TIME | DC OUTPUT VOLTAGE S75 | ELECTRIC CURRENT | FREQUENCY LIMIT | LIMITED UPPER LIMIT VOLTAGE |
|---|---|---|---|---|
| 0msec | 0V | 0μA | 113.00kHz | -600V |
| 5msec | -150V | 30μA | 113.00kHz | -600V |
| 10msec | -370V | 74μA | 112.63kHz | -600V |
| 15msec | -580V | 116μA | 112.07kHz | -660V |
| 20msec | -790V | 158μA | 111.19kHz | -730V |
| 25msec | -950V | 190μA | 110.42kHz | -860V |
| 30msec | -1100V | 220μA | 109.76kHz | -990V |
| 35msec | -1220V | 244μA | 108.97kHz | -1100V |
| 40msec | -1260V | 252μA | 108.50kHz | -1220V |
| 45msec | -1230V | 246μA | 108.92kHz | -1260V |
| 50msec | -1210V | 242μA | 109.09kHz | -1230V |
| 55msec | -1200V | 240μA | 109.23kHz | -1210V |
| 60msec | -1200V | 240μA | 109.23kHz | -1200V |
| 65msec | -1200V | 240μA | 109.23kHz | -1200V |
| 70msec | -1200V | 240μA | 109.23kHz | -1200V |
| 75msec | -1200V | 240μA | 109.23kHz | -1200V |
| 80msec | -1200V | 240μA | 109.23kHz | -1200V |
| 85msec | -1200V | 240μA | 109.23kHz | -1200V |
| 90msec | -1200V | 240μA | 109.23kHz | -1200V |
| 95msec | -1200V | 240μA | 109.23kHz | -1200V |
| 100msec | -1200V | 240μA | 109.23kHz | -1200V |
| 105msec | -1200V | 240μA | 109.23kHz | -1200V |
| 110msec | -1200V | 240μA | 109.23kHz | -1200V |
| 115msec | -1200V | 240μA | 109.23kHz | -1200V |
| 120msec | -1200V | 240μA | 109.23kHz | -1200V |
| 125msec | -1200V | 240μA | 109.23kHz | -1200V |
| 130msec | -1200V | 240μA | 109.23kHz | -1200V |
| 135msec | -1200V | 240μA | 109.23kHz | -1200V |
| 140msec | -1200V | 240μA | 109.23kHz | -1200V |

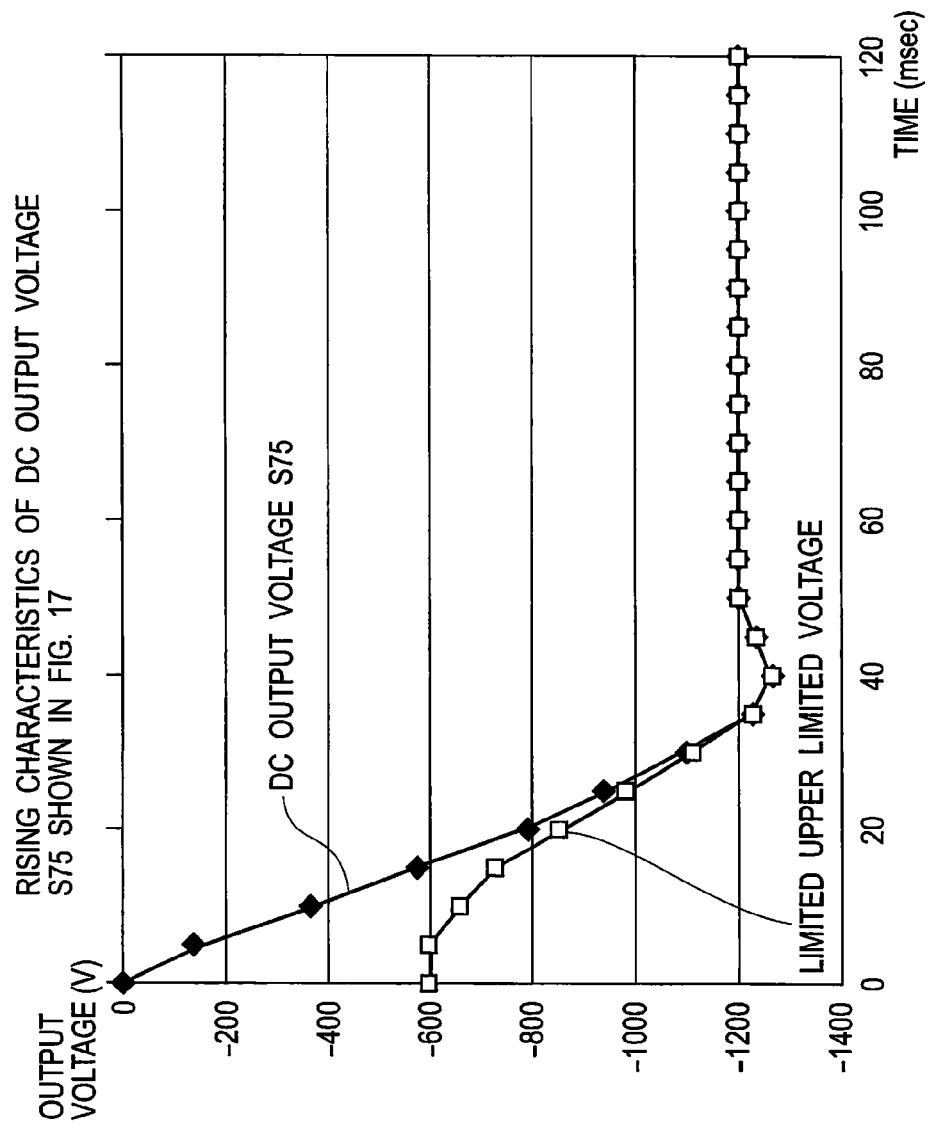

HIGH-VOLTAGE POWER-SUPPLY APPARATUS OF EMBODIMENT 2

FIG. 24-1

PWM SETUP VALUE AND DC OUTPUT VOLTAGE S75

| 8-BIT SETUP VALUE | OUTPUT VOLTAGE | 8-BIT SETUP VALUE | OUTPUT VOLTAGE | 8-BIT SETUP VALUE | OUTPUT VOLTAGE | 8-BIT SETUP VALUE | OUTPUT VOLTAGE |
|---|---|---|---|---|---|---|---|
| 00hex | -440V | 20hex | -385V | 40hex | -329V | 60hex | -274V |
| 01hex | -438V | 21hex | -383V | 41hex | -328V | 61hex | -272V |
| 02hex | -437V | 22hex | -381V | 42hex | -326V | 62hex | -270V |
| 03hex | -435V | 23hex | -379V | 43hex | -324V | 63hex | -269V |
| 04hex | -433V | 24hex | -378V | 44hex | -322V | 64hex | -267V |
| 05hex | -431V | 25hex | -376V | 45hex | -321V | 65hex | -265V |
| 06hex | -430V | 26hex | -374V | 46hex | -319V | 66hex | -264V |
| 07hex | -428V | 27hex | -373V | 47hex | -317V | 67hex | -262V |
| 08hex | -426V | 28hex | -371V | 48hex | -315V | 68hex | -260V |
| 09hex | -424V | 29hex | -369V | 49hex | -314V | 69hex | -258V |
| 0Ahex | -423V | 2Ahex | -367V | 4Ahex | -312V | 6Ahex | -257V |
| 0Bhex | -421V | 2Bhex | -366V | 4Bhex | -310V | 6Bhex | -255V |
| 0Chex | -419V | 2Chex | -364V | 4Chex | -309V | 6Chex | -253V |
| 0Dhex | -418V | 2Dhex | -362V | 4Dhex | -307V | 6Dhex | -251V |
| 0Ehex | -416V | 2Ehex | -360V | 4Ehex | -305V | 6Ehex | -250V |
| 0Fhex | -414V | 2Fhex | -359V | 4Fhex | -303V | 6Fhex | -248V |
| 10hex | -412V | 30hex | -357V | 50hex | -302V | 70hex | -246V |
| 11hex | -411V | 31hex | -355V | 51hex | -300V | 71hex | -245V |
| 12hex | -409V | 32hex | -354V | 52hex | -298V | 72hex | -243V |
| 13hex | -407V | 33hex | -352V | 53hex | -296V | 73hex | -241V |
| 14hex | -405V | 34hex | -350V | 54hex | -295V | 74hex | -239V |
| 15hex | -404V | 35hex | -348V | 55hex | -293V | 75hex | -238V |
| 16hex | -402V | 36hex | -347V | 56hex | -291V | 76hex | -236V |
| 17hex | -400V | 37hex | -345V | 57hex | -289V | 77hex | -234V |
| 18hex | -398V | 38hex | -434V | 58hex | -288V | 78hex | -232V |
| 19hex | -397V | 39hex | -341V | 59hex | -286V | 79hex | -231V |
| 1Ahex | -395V | 3Ahex | -340V | 5Ahex | -284V | 7Ahex | -229V |
| 1Bhex | -393V | 3Bhex | -338V | 5Bhex | -283V | 7Bhex | -227V |
| 1Chex | -392V | 3Chex | -336V | 5Chex | -281V | 7Chex | -225V |
| 1Dhex | -390V | 3Dhex | -334V | 5Dhex | -279V | 7Dhex | -224V |
| 1Ehex | -388V | 3Ehex | -333V | 5Ehex | -277V | 7Ehex | -222V |
| 1Fhex | -386V | 3Fhex | -331V | 5Fhex | -276V | 7Fhex | -220V |

FIG. 24-2

PWM SETUP VALUE AND DC OUTPUT VOLTAGE S75

| 8-BIT SETUP VALUE | OUTPUT VOLTAGE | 8-BIT SETUP VALUE | OUTPUT VOLTAGE | 8-BIT SETUP VALUE | OUTPUT VOLTAGE | 8-BIT SETUP VALUE | OUTPUT VOLTAGE |
|---|---|---|---|---|---|---|---|
| 80hex | -219V | A0hex | -163V | C0hex | -108V | E0hex | -75V |
| 81hex | -217V | A1hex | -161V | C1hex | -106V | E1hex | -75V |
| 82hex | -215V | A2hex | -160V | C2hex | -104V | E2hex | -75V |
| 83hex | -213V | A3hex | -158V | C3hex | -103V | E3hex | -75V |
| 84hex | -212V | A4hex | -156V | C4hex | -101V | E4hex | -75V |
| 85hex | -210V | A5hex | -155V | C5hex | -99V | E5hex | -75V |
| 86hex | -208V | A6hex | -153V | C6hex | -97V | E6hex | -75V |
| 87hex | -206V | A7hex | -151V | C7hex | -96V | E7hex | -75V |
| 88hex | -205V | A8hex | -149V | C8hex | -94V | E8hex | -75V |
| 89hex | -203V | A9hex | -148V | C9hex | -92V | E9hex | -75V |
| 8Ahex | -201V | AAhex | -146V | CAhex | -91V | EAhex | -75V |
| 8Bhex | -200V | ABhex | -144V | CBhex | -89V | EBhex | -75V |
| 8Chex | -198V | AChex | -142V | CChex | -87V | EChex | -75V |
| 8Dhex | -196V | ADhex | -141V | CDhex | -85V | EDhex | -75V |
| 8Ehex | -194V | AEhex | -139V | CEhex | -84V | EEhex | -75V |
| 8Fhex | -193V | AFhex | -137V | CFhex | -82V | EFhex | -75V |
| 90hex | -191V | B0hex | -136V | D0hex | -80V | F0hex | -75V |
| 91hex | -189V | B1hex | -134V | D1hex | -78V | F1hex | -75V |
| 92hex | -187V | B2hex | -132V | D2hex | -77V | F2hex | -75V |
| 93hex | -186V | B3hex | -130V | D3hex | -75V | F3hex | -75V |
| 94hex | -184V | B4hex | -129V | D4hex | -75V | F4hex | -75V |
| 95hex | -182V | B5hex | -127V | D5hex | -75V | F5hex | -75V |
| 96hex | -181V | B6hex | -125V | D6hex | -75V | F6hex | -75V |
| 97hex | -179V | B7hex | -123V | D7hex | -75V | F7hex | -75V |
| 98hex | -177V | B8hex | -122V | D8hex | -75V | F8hex | -75V |
| 99hex | -175V | B9hex | -120V | D9hex | -75V | F9hex | -75V |
| 9Ahex | -174V | BAhex | -118V | DAhex | -75V | FAhex | -75V |
| 9Bhex | -172V | BBhex | -116V | DBhex | -75V | FBhex | -75V |
| 9Chex | -170V | BChex | -115V | DChex | -75V | FChex | -75V |
| 9Dhex | -168V | BDhex | -113V | DDhex | -75V | FDhex | -75V |
| 9Ehex | -167V | BEhex | -111V | DEhex | -75V | FEhex | -75V |
| 9Fhex | -165V | BFhex | -110V | DFhex | -75V | FFhex | -75V |

FIG. 25-1

TABLE REGISTERS 111-1, 111-2 SHOWN IN FIG. 23

| 8-BIT SETUP VALUE | 7-BIT OUTPUT VALUE | 8-BIT SETUP VALUE | 7-BIT OUTPUT VALUE | 8-BIT SETUP VALUE | 7-BIT OUTPUT VALUE | 8-BIT SETUP VALUE | 7-BIT OUTPUT VALUE |
|---|---|---|---|---|---|---|---|
| 00hex | 44hex | 20hex | 4Ahex | 40hex | 50hex | 60hex | 56hex |
| 01hex | 44hex | 21hex | 4Ahex | 41hex | 50hex | 61hex | 56hex |
| 02hex | 44hex | 22hex | 4Ahex | 42hex | 51hex | 62hex | 57hex |
| 03hex | 45hex | 23hex | 4Bhex | 43hex | 51hex | 63hex | 57hex |
| 04hex | 45hex | 24hex | 4Bhex | 44hex | 51hex | 64hex | 57hex |
| 05hex | 45hex | 25hex | 4Bhex | 45hex | 51hex | 65hex | 57hex |
| 06hex | 45hex | 26hex | 4Bhex | 46hex | 51hex | 66hex | 57hex |
| 07hex | 45hex | 27hex | 4Bhex | 47hex | 51hex | 67hex | 58hex |
| 08hex | 46hex | 28hex | 4Chex | 48hex | 52hex | 68hex | 58hex |
| 09hex | 46hex | 29hex | 4Chex | 49hex | 52hex | 69hex | 58hex |
| 0Ahex | 46hex | 2Ahex | 4Chex | 4Ahex | 52hex | 6Ahex | 58hex |
| 0Bhex | 46hex | 2Bhex | 4Chex | 4Bhex | 52hex | 6Bhex | 58hex |
| 0Chex | 46hex | 2Chex | 4Chex | 4Chex | 52hex | 6Chex | 59hex |
| 0Dhex | 46hex | 2Dhex | 4Chex | 4Dhex | 53hex | 6Dhex | 59hex |
| 0Ehex | 47hex | 2Ehex | 4Chex | 4Ehex | 53hex | 6Ehex | 59hex |
| 0Fhex | 47hex | 2Fhex | 4Chex | 4Fhex | 53hex | 6Fhex | 59hex |
| 10hex | 47hex | 30hex | 4Chex | 50hex | 53hex | 70hex | 59hex |
| 11hex | 47hex | 31hex | 4Chex | 51hex | 53hex | 71hex | 59hex |
| 12hex | 47hex | 32hex | 4Ehex | 52hex | 54hex | 72hex | 5Ahex |
| 13hex | 48hex | 33hex | 4Ehex | 53hex | 54hex | 73hex | 5Ahex |
| 14hex | 48hex | 34hex | 4Ehex | 54hex | 54hex | 74hex | 5Ahex |
| 15hex | 48hex | 35hex | 4Ehex | 55hex | 54hex | 75hex | 5Ahex |
| 16hex | 48hex | 36hex | 4Ehex | 56hex | 54hex | 76hex | 5Ahex |
| 17hex | 48hex | 37hex | 4Ehex | 57hex | 55hex | 77hex | 5Bhex |
| 18hex | 49hex | 38hex | 4Fhex | 58hex | 55hex | 78hex | 5Bhex |
| 19hex | 49hex | 39hex | 4Fhex | 59hex | 55hex | 79hex | 5Bhex |
| 1Ahex | 49hex | 3Ahex | 4Fhex | 5Ahex | 55hex | 7Ahex | 5Bhex |
| 1Bhex | 49hex | 3Bhex | 4Fhex | 5Bhex | 55hex | 7Bhex | 5Bhex |
| 1Chex | 49hex | 3Chex | 4Fhex | 5Chex | 55hex | 7Chex | 5Chex |
| 1Dhex | 4Ahex | 3Dhex | 50hex | 5Dhex | 56hex | 7Dhex | 5Chex |
| 1Ehex | 4Ahex | 3Ehex | 50hex | 5Ehex | 56hex | 7Ehex | 5Chex |
| 1Fhex | 4Ahex | 3Fhex | 50hex | 5Fhex | 56hex | 7Fhex | 5Chex |

FIG. 25-2

TABLE REGISTERS 111-1, 111-2 SHOWN IN FIG. 23

| 8-BIT SETUP VALUE | 7-BIT OUTPUT VALUE | 8-BIT SETUP VALUE | 7-BIT OUTPUT VALUE | 8-BIT SETUP VALUE | 7-BIT OUTPUT VALUE | 8-BIT SETUP VALUE | 7-BIT OUTPUT VALUE |
|---|---|---|---|---|---|---|---|
| 80hex | 5Chex | A0hex | 62hex | C0hex | 68hex | E0hex | 6Chex |
| 81hex | 5Dhex | A1hex | 63hex | C1hex | 69hex | E1hex | 6Chex |
| 82hex | 5Dhex | A2hex | 63hex | C2hex | 69hex | E2hex | 6Chex |
| 83hex | 5Dhex | A3hex | 63hex | C3hex | 69hex | E3hex | 6Chex |
| 84hex | 5Dhex | A4hex | 63hex | C4hex | 69hex | E4hex | 6Chex |
| 85hex | 5Dhex | A5hex | 63hex | C5hex | 69hex | E5hex | 6Chex |
| 86hex | 5Dhex | A6hex | 64hex | C6hex | 6Ahex | E6hex | 6Chex |
| 87hex | 5Ehex | A7hex | 64hex | C7hex | 6Ahex | E7hex | 6Chex |
| 88hex | 5Ehex | A8hex | 64hex | C8hex | 6Ahex | E8hex | 6Chex |
| 89hex | 5Ehex | A9hex | 64hex | C9hex | 6Ahex | E9hex | 6Chex |
| 8Ahex | 5Ehex | AAhex | 64hex | CAhex | 6Ahex | EAhex | 6Chex |
| 8Bhex | 5Ehex | ABhex | 64hex | CBhex | 6Bhex | EBhex | 6Chex |
| 8Chex | 5Fhex | AChex | 65hex | CChex | 6Bhex | EChex | 6Chex |
| 8Dhex | 5Fhex | ADhex | 65hex | CDhex | 6Bhex | EDhex | 6Chex |
| 8Ehex | 5Fhex | AEhex | 65hex | CEhex | 6Bhex | EEhex | 6Chex |
| 8Fhex | 5Fhex | AFhex | 65hex | CFhex | 6Bhex | EFhex | 6Chex |
| 90hex | 5Fhex | B0hex | 65hex | D0hex | 6Chex | F0hex | 6Chex |
| 91hex | 60hex | B1hex | 66hex | D1hex | 6Chex | F1hex | 6Chex |
| 92hex | 60hex | B2hex | 66hex | D2hex | 6Chex | F2hex | 6Chex |
| 93hex | 60hex | B3hex | 66hex | D3hex | 6Chex | F3hex | 6Chex |
| 94hex | 60hex | B4hex | 66hex | D4hex | 6Chex | F4hex | 6Chex |
| 95hex | 60hex | B5hex | 66hex | D5hex | 6Chex | F5hex | 6Chex |
| 96hex | 61hex | B6hex | 67hex | D6hex | 6Chex | F6hex | 6Chex |
| 97hex | 61hex | B7hex | 67hex | D7hex | 6Chex | F7hex | 6Chex |
| 98hex | 61hex | B8hex | 67hex | D8hex | 6Chex | F8hex | 6Chex |
| 99hex | 61hex | B9hex | 67hex | D9hex | 6Chex | F9hex | 6Chex |
| 9Ahex | 61hex | BAhex | 67hex | DAhex | 6Chex | FAhex | 6Chex |
| 9Bhex | 61hex | BBhex | 68hex | DBhex | 6Chex | FBhex | 6Chex |
| 9Chex | 62hex | BChex | 68hex | DChex | 6Chex | FChex | 6Chex |
| 9Dhex | 62hex | BDhex | 68hex | DDhex | 6Chex | FDhex | 6Chex |
| 9Ehex | 62hex | BEhex | 68hex | DEhex | 6Chex | FEhex | 6Chex |
| 9Fhex | 62hex | BFhex | 68hex | DFhex | 6Chex | FFhex | 6Chex | she# HIGH-VOLTAGE POWER-SUPPLY APPARATUS, AND IMAGE FORMATION APPARATUS

CROSS REFERENCE TO RELATED APPLICATIONS

This application claims priority based on 35 USC 119 from prior Japanese Patent Application No. 2011-179046 filed on Aug. 18, 2011, entitled " HIGH-VOLTAGE POWER-SUPPLY APPARATUS AND IMAGE FORMATION APPARATUS", the entire contents of which are incorporated herein by reference.

BACKGROUND OF THE INVENTION

1. Field of the Invention

This disclosure relates to: a high-voltage power-supply apparatus for outputting a high output voltage by controlling a piezoelectric transducer; and an image formation apparatus of the electrophotographic type or the like that employs the high-voltage power-supply apparatus.

2. Description of Related art

A conventional high-voltage power-supply apparatus outputs a high voltage by controlling a piezoelectric transducer in accordance with an output signal from a voltage-controlled oscillator (VCO) as described in Patent Document 1 mentioned below. Here, the piezoelectric transducer is a device capable of generating a high voltage from an inputted low voltage using the resonance phenomenon of a piezoelectric vibrator. Furthermore, upon application of a heavy load such as a load short-circuit, the conventional high-voltage power-supply apparatus forcedly confines the control frequency to a predetermined range by reversing the controlled polarity of an output to the VCO according to an output signal from an error amplifier (see, for example, Patent Document 1: Japanese Patent Application Publication No. 11-252905).

SUMMARY OF THE INVENTION

As described above, upon application of a heavy load such as a load short-circuit, the conventional high-voltage power-supply apparatus determines whether or not to reverse the output signal of the error amplifier in accordance with whether or not the output signal is within the control range. The conventional high-voltage power-supply apparatus, however, has a problem of being incapable of controlling the output voltage of the high-voltage power-supply apparatus when the output signal of the error amplifier is in a reversed state.

An aspect of the invention is a high-voltage power-supply apparatus. The apparatus comprises: a controller configured to output a control signal containing a pulse with a variable drive frequency; a switching unit configured to be switched by the control signal and output a drive signal; a piezoelectric transducer having a predetermined resonant frequency, and configured to be driven by the drive signal and output a high-voltage output voltage; a current detector configured to detect an electric current of a load connected to an output side of the piezoelectric transducer and output a current-detection result; and a lower-limit-value setup unit configured to set a frequency lower limit value for the drive frequency of the controller. The controller varies the frequency lower limit value in accordance with the current-detection result.

According to this aspect, the current detector detects the load current, and the frequency range of the control signal is varied in accordance with the current-detection result. Hence, the control range is varied in accordance with the load current. Accordingly, even under a heavy load that alters the Q factor, the high-voltage power-supply apparatus including the piezoelectric transducer can be stably controlled. In addition, even when the load fluctuates rapidly, the frequency range of the control signal is changed immediately. Hence, the output voltage is adjusted to the target voltage with the drive frequency controlled within a range of the resonant frequency of the piezoelectric transducer or above. In addition, even when the frequency characteristics of the piezoelectric transducer change, the necessary output voltage can be obtained as long as the necessary current can be taken out. Furthermore, even in the event of an abnormality such as a load release, immediate control can be made to adjust the output voltage to the target voltage without producing a high voltage.

BRIEF DESCRIPTION OF THE DRAWINGS

FIG. 7 is a table showing the input values into and the output values from table register 83-1 shown in FIG. 5.

FIG. 8 is a table showing the input values into and the output values from table register 83-2 shown in FIG. 5.

FIG. 9-1 is a table showing the input values into and the output values from counter upper-limit-value table 91 shown in FIG. 5.

FIG. 9-2 is another table showing the input values into and the output values from counter upper-limit-value table 91 shown in FIG. 5.

FIG. 10-1 is a table showing the relationship between the electric-current value and the limit frequency value of counter upper-limit-value table 91 shown in FIG. 5.

FIG. 10-2 is another table illustrating the relationship between the electric-current value and the limit frequency value of counter upper-limit-value table 91 shown in FIG. 5.

FIG. 11 is a table showing drive frequencies and corresponding values of DC output voltage S75 in high-voltage power-supply apparatus 70 shown in FIG. 2 with no load, a 20-MΩ load, a 10-MΩ load and a 5-MΩ load.

FIG. 12 is a table showing electric-current values corresponding to the values of DC output voltage S75 shown in FIG. 11. FIG. 13 is a table showing relations of each of the values of DC output voltage S75 with output-voltage detection signal S77 inputted into 12-bit ADC 80 (shown in FIG. 5), a detection value of 12-bit ADC 80, a 12-bit input value into operation unit 82-2 (shown in FIG. 5), a 10-bit input value into comparator 88 (shown in FIG. 5), and a corresponding 8-bit target value (shown in FIG. 5) expressed by data DATA.

FIG. 14 is a graph corresponding to FIG. 11.

FIG. 15 is a flowchart showing the operations of error-hold register 105 shown in FIG. 5.

FIG. 16 is a flowchart showing the operations of operation unit 82-2 shown in FIG. 5.

FIG. 17 is a table showing the rise characteristics of DC output voltage S75 of a case where 5-MΩ load 79 is connected to high-voltage power-supply apparatus 70 shown in FIGS. 1 and 2.

FIG. 18 is a graph showing the rise characteristics of DC output voltage S75 shown in FIG. 17.

FIG. 19 is a graph that becomes paired with FIG. 18 under the same conditions and shows current characteristics of DC output current S75a.

FIG. 24-1 is a table showing the relationship between PWM setup value and DC output voltage S75.

FIG. 24-2 is another table showing the relationship between the PWM setup value and DC output voltage S75.

FIG. 25-1 is a table showing output values corresponding to the setup values in table registers 111-1, 111-2 shown in FIG. 23.

FIG. 25-2 is another table showing output values corresponding to the setup values in table registers 111-1, 111-2 shown in FIG. 23.

DETAILED DESCRIPTION OF EMBODIMENTS

Modes for carrying out the invention are made clear by the description of preferred embodiments given below in combination with the accompanying drawings. It should be noted that the drawings are given only for the explanatory purposes and do not intend to restrict the scope of the invention.

First Embodiment (Configuration of Image Formation Apparatus)

Figure 3:
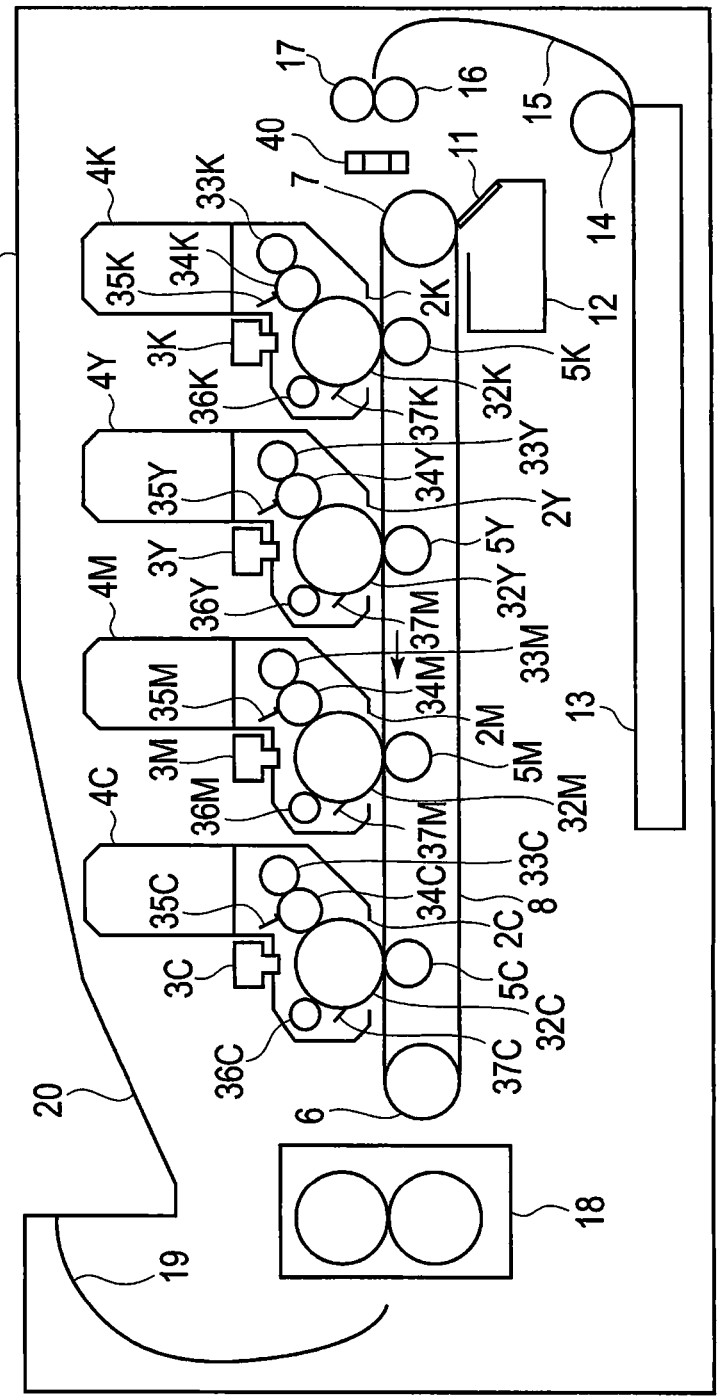
FIG. 3 is a configuration diagram showing an image formation apparatus using the high-voltage power-supply apparatus according to the first embodiment of the invention.

FIG. 3 is a configuration diagram showing an image formation apparatus using a high-voltage power-supply apparatus according to a first embodiment of the invention.

Image formation apparatus 1 is an electrophotographic color image formation apparatus. Black development unit 2K, yellow development unit 2Y, magenta development unit 2M and cyan development unit 2C are removably set in image formation apparatus 1. In development units 2K, 2Y, 2M, 2C, photosensitive drums 32K, 32Y, 32M, 32C of the four colors are electrically charged uniformly by charger rollers 36K, 36Y, 36M, 36C of the four colors which are in contact with photosensitive drums 32K, 32Y, 32M, 32C, respectively. Latent images are formed on electrically-charged photosensitive drums 32K, 32Y, 32M, 32C of the four colors by light emitted from black LED (light-emitting diode) head 3K, yellow LED head 3Y, magenta LED head 3M, and cyan LED head 3C, respectively.

In development unit 2K, 2Y, 2M, 2C, toner-supply rollers 33K, 33Y, 33M, 33C of the four colors supply toners to development rollers 34K, 34Y, 34M 34C, respectively. Development blades 35K, 35Y, 35M, 35C of the four colors form uniform toner layers on the surfaces of development rollers 34K, 34Y, 34M, 34C, respectively. Toner images are formed on photosensitive drums 32K, 32Y, 32M, 32C. In development units 2K, 2Y, 2M, 2C of the four colors, cleaning blades 37K, 37Y, 37M, 37C clean off of photosensitive drums 32K, 32Y, 32M, 32C toners that remain on the drum surfaces after the transfer of the images.

Black toner cartridge 4K, yellow toner cartridge 4Y, magenta toner cartridge 4M, and cyan toner cartridge 4C are removably set in development units 2K, 2Y, 2M, 2C, respectively. Toner cartridges 4K, 4Y, 4M and 4C have a structure which makes them capable of supplying toners stored inside thereof to development units 2K, 2Y, 2M, 2C, respectively. Black image-transfer roller 5K, yellow image-transfer roller 5Y, magenta image-transfer roller 5M, and cyan image-transfer roller 5C, serving as image-transfer units, are placed in a manner that biases can be applied to image-transfer nips from the backside of image-transfer belt 8. Image-transfer-belt drive roller 6 and image-transfer-belt follower roller 7 have a structure in which image-transfer belt 8 loops around image-transfer-belt drive roller 6 and image-transfer-belt follower roller 7, and which makes image-transfer-belt drive roller 6 and image-transfer-belt follower roller 7 capable of transporting a print medium (e.g., a sheet of paper) 15 due to their drives.

Image-transfer belt cleaning blade 11 is designed to be capable of scraping toners off from the surface of image-transfer belt 8. The toners thus scraped off are collected into image-transfer-belt cleaner container 12. Sheet cassette 13 is removably set in image formation apparatus 1, and a stack of sheets of paper 15 are held in sheet cassette 13. Hopping roller 14 transports sheet of paper 15 from sheet cassette 13. Register rollers 16, 17 transport sheet of paper 15 to image-transfer belt 8 at a predetermined timing. Image-fixation unit 18 fixes the toner image on sheet of paper 15 by applying heat and pressure. Sheet guide 19 discharges sheet of paper 15 out to sheet-delivery tray 20 where sheet of paper 15 is laid facedown. Sheet-detection sensor 40 is configured to detect, by either a contact or a non-contact method, the passing of sheet of paper 15 and is provided downstream of register rollers 16, 17.

Figure 4:
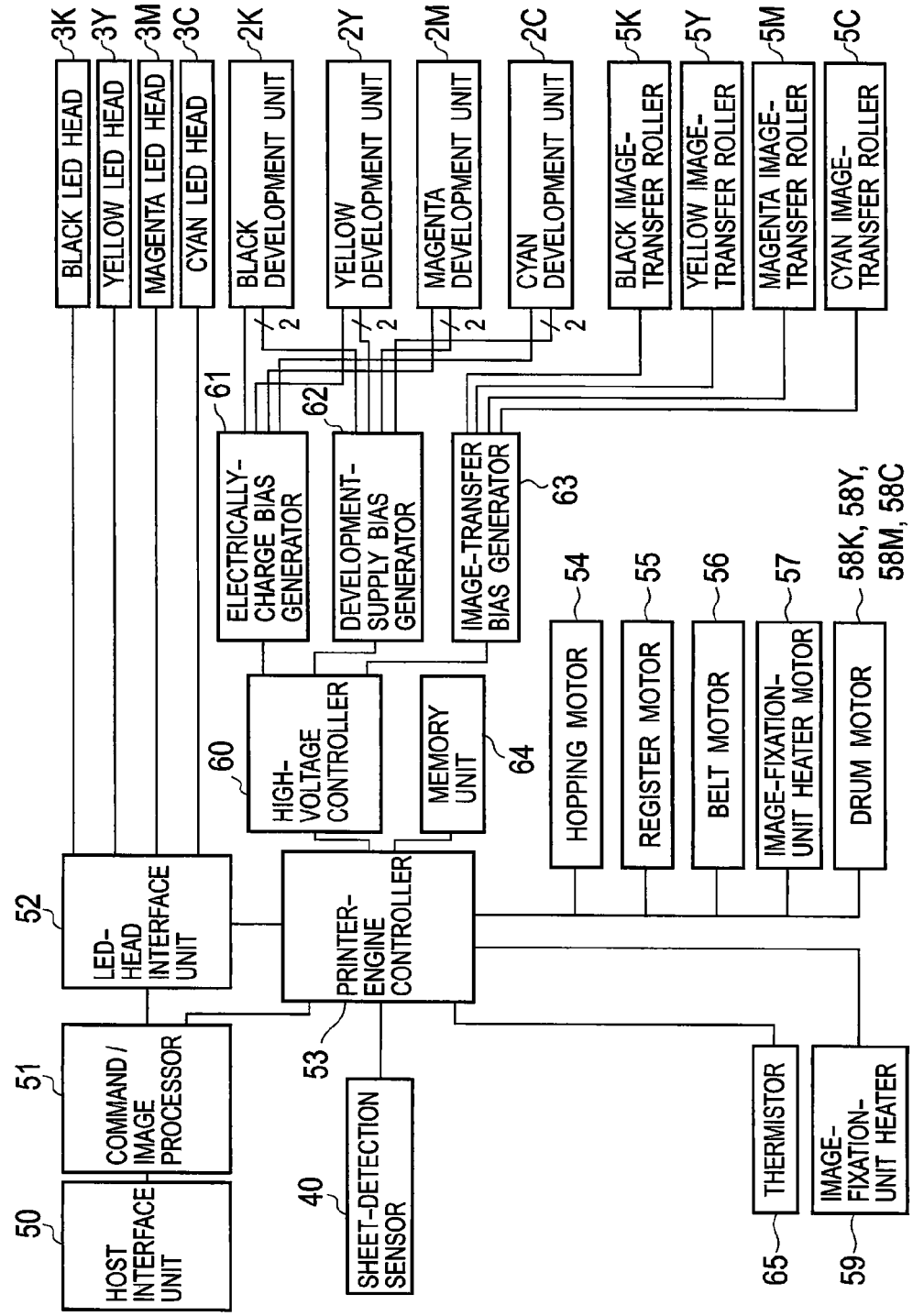
FIG. 4 is a block diagram showing the configuration of a controller circuit of image formation apparatus 1 shown in FIG. 3.

FIG. 4 is a block diagram showing the configuration of a controller circuit of image formation apparatus 1 shown in FIG. 3.

The controller circuit includes host interface unit 50. Host interface unit 50 exchanges data with command/image processor 51. Head drive pulse and the like for LED-head interface unit 52 are controlled by printer-engine controller 53, and thus makes LED heads 3K, 3Y, 3M, 3C emit light.

On the basis of output signals from, for example, command/image processor 51, sheet-detection sensor 40 and the like, printer-engine controller 53 sends, to controller (e.g., high-voltage controller) 60, control values such as an electrically-charge bias, a development bias, an image-transfer bias, and the like. High-voltage controller 60 sends signals to electrically-charge bias generator 61, development-supply bias generator 62, and image-transfer bias generator 63. Electrically-charge bias generator 61 and development-supply bias generator 62 apply biases to charger rollers 36K, 36Y, 36M, 36C, and development rollers 34K, 34Y, 34M, 34C, which are provided in black development unit 2K, yellow development unit 2Y, magenta development unit 2M, and cyan development unit 2C. For example, high-voltage controller 60 and electrically-charge bias generator 61 constitute the high-voltage power-supply apparatus of the first embodiment of the invention. Image-transfer bias generator 63 applies biases to black image-transfer roller 5K, yellow image-transfer roller 5Y, magenta image-transfer roller 5M, and cyan image-transfer roller 5C. Sheet-detection sensor 40 is used to adjust the timing for generating the image-transfer biases from image-transfer bias generator 63.

Printer-engine controller 53 drives hopping motor 54, register motor 55, belt motor 56, image-fixation-unit heater motor 57, and drum motors 58K, 58Y, 58M, 58C of the four colors at their respective timings. The temperature of image-fixation-unit heater 59 is controlled by printer-engine controller 53 in accordance with the value detected by thermistor 65.

(Configuration of High-Voltage Power-Supply Apparatus)

Figure 1:
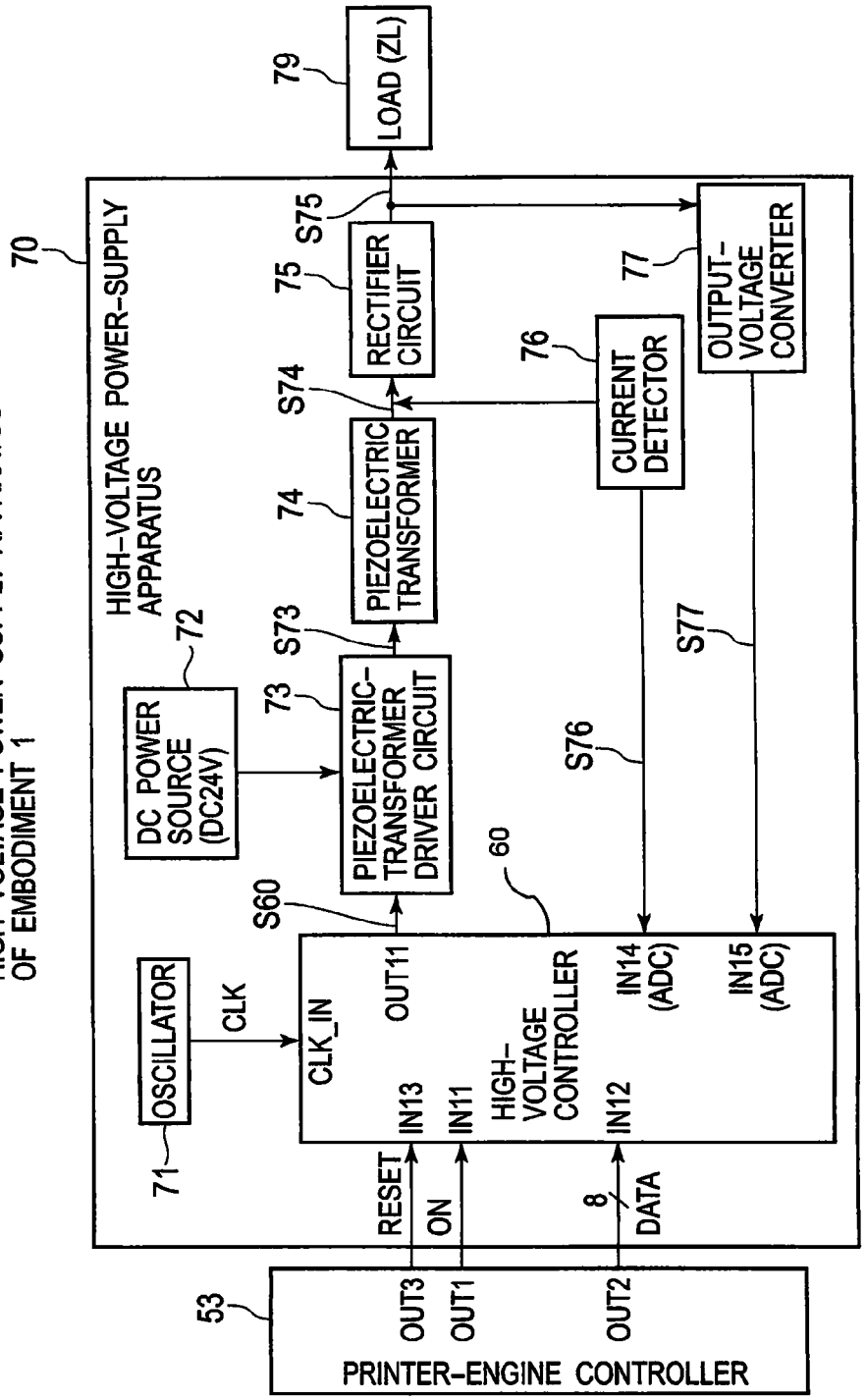
FIG. 1 is a block diagram schematically showing the configuration of a high-voltage power-supply apparatus according to a first embodiment of the invention.

FIG. 1 is a block diagram schematically showing the configuration of the high-voltage power-supply apparatus according to the first embodiment of the invention.

High-voltage power-supply apparatus 70 includes high-voltage controller 60 and electrically-charge bias generator 61 shown in FIG. 4. High-voltage power-supply apparatus 70 receives: ON-signal ON, which is a control signal supplied from output port OUT1 of printer-engine controller 53; input of 8-bit data DATA, which represents the target voltage value of the electrically-charge bias and which is supplied from output port OUT2; and reset signal RESET, which is a control signal supplied from output port OUT3. High-voltage power-supply apparatus 70 generates high-voltage direct-current (DC) output voltage S75, and supplies the high-voltage DC output voltage S75 to load (ZL) 79 that corresponds to an electrical charger device for four channels.

High-voltage power-supply apparatus 70 includes oscillator 71 configured to generate reference clock signal (hereinafter, simply referred to as the "clock") CLK with a certain constant frequency (e.g., 50 MHz). High-voltage controller 60 serving as a controller is connected to the output side of oscillator 71. High-voltage controller 60 is a circuit that, on the basis of control signals (e.g., ON-signal ON and reset signal RESET) supplied from printer-engine controller 53, divides the frequency of clock CLK supplied from oscillator 71, and outputs control pulse S60 serving as a control signal containing pulses.

High-voltage controller 60 includes: input port CLK_IN where clock CLK is inputted; input port IN11 through which ON-signal ON is inputted; input port IN12 through which 8-bit data is inputted; input port IN13 through which reset signal RESET is inputted; input port IN14 through which output-current detection result (e.g., output-current detection signal) S76 is inputted and which gives inputted output-current detection result S76 to an analog/digital converter (ADC) provided inside; input port IN15 through which output-voltage detection result (e.g., output-voltage detection signal) S77 is inputted and which gives inputted output-voltage detection result S77 to an ADC provided inside; and output port OUT11 through which control pulse S60 is outputted. The ON/OFF of control pulse S60 outputted from output port OUT11 is controlled by inputted ON-signal ON. The output settings of output port OUT11 are initialized by inputted reset signal RESET.

For example, high-voltage controller 60 is made from: an application specific integrated circuit (ASIC), which is an integrated circuit that gathers together circuits of various functions for a particular purpose); a microprocessor with a built-in central processing unit (hereinafter referred to as a "CPU"); or a field programmable gate array (FPGA), which is a kind of gate array that enables the user to program his/her own logic circuit. It should be noted that although high-voltage controller 60 shown in FIG. 1 is provided in high-voltage power-supply apparatus 70, high-voltage controller 60 may be provided outside of high-voltage power-supply apparatus 70.

Switch device (e.g., piezoelectric transducer driver circuit) 73 is connected to output port OUT11 of high-voltage controller 60, and to DC power source 72 which outputs 24-V DC and which is shared by all the channels (chs). Piezoelectric-transducer driver circuit 73 is a circuit configured to output drive signal (e.g., drive pulse) S73 by using a switching element. Piezoelectric transducer 74 is connected to the output side of piezoelectric transducer driver circuit 73. Piezoelectric transducer 74 is a transducer configured to boost the voltage of drive pulse S73 by making use of the resonance phenomenon of a piezoelectric vibrator such as ceramics, and to thus output high-voltage alternate-current (AC) output voltage S74. Rectifier (e.g., rectifier circuit) 75 is connected to the output side of piezoelectric transducer 74. Rectifier circuit 75 is a circuit configured to convert high-voltage AC output voltage S74, outputted by piezoelectric transducer 74, to high-voltage DC output voltage S75, and to supply high-voltage DC output voltage S75 to load 79.

Current detector 76 is connected to the output side of piezoelectric transducer 74. Current detector 76 is a circuit configured to detect output current (I) of piezoelectric transducer 74 by converting output current (I) to voltage (V), and to output output-current detection signal S76 to input port IN14 of high-voltage controller 60. In addition, output-voltage detector (e.g., output-voltage converter) 77 is connected to the output side of rectifier circuit 75. Output-voltage converter 77 is a circuit configured to convert high-voltage DC output voltage S75 outputted by rectifier circuit 75 to low-voltage output-voltage detection signal S77, and to output low-voltage output-voltage detection signal S77 to input port IN15 of high-voltage controller 60.

Figure 2:
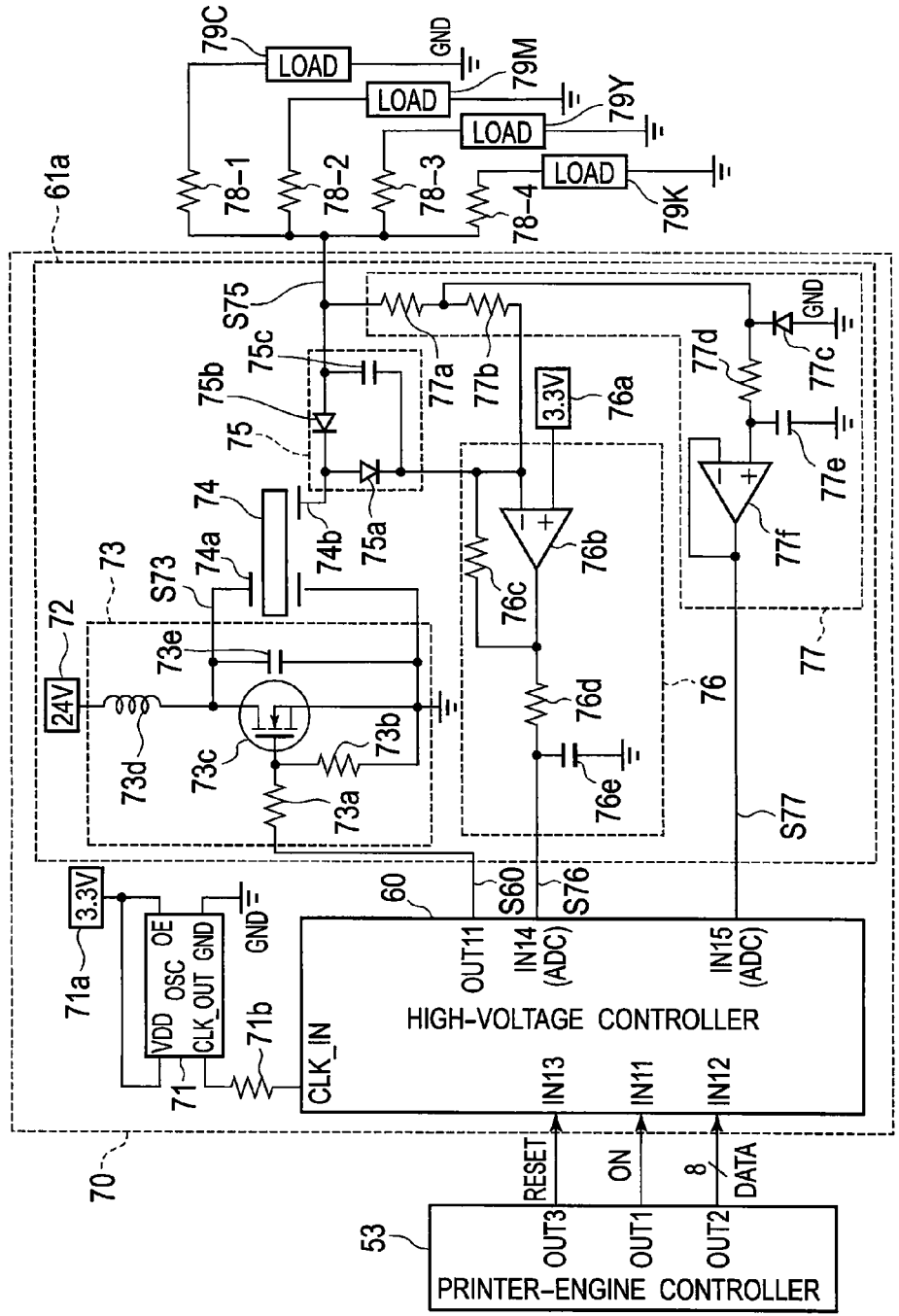
FIG. 2 is a circuit diagram showing an example of a detailed configuration of high-voltage power-supply apparatus 70 shown in FIG. 1.

FIG. 2 is a circuit diagram showing an example of a detailed configuration of high-voltage power-supply apparatus 70 shown in FIG. 1.

Oscillator 71 is a circuit activated by the 3.3-V DC supplied from 3.3-V DC power source 71a and thereby generating clock CLK with an oscillatory frequency of 50 MHz. Oscillator 71 includes: power supply terminal VDD to which 3.3-V DC is applied; output enable terminal OE to which 3.3-V DC is applied; clock output terminal CLK_OUT through which clock CLK is outputted; and ground terminal GND. Clock output terminal CLK_OUT is connected to input port CLK_IN of high-voltage controller 60 via resistor 71b.

Piezoelectric-transducer driver circuit 74 in electrically-charging high-voltage circuit 61a is connected to output port OUT11 of high-voltage controller 60 that is operated in synchronization with clock CLK. Output port OUT11 is the port through which control pulse S60 is outputted. In addition, 24-V DC power source 72 is connected to piezoelectric transducer driver circuit 74. DC power source 72 is a power source of 24-V DC that is supplied by transforming and rectifying 100-V AC (commercial power source) from, for example, a low-voltage power-supply apparatus, which is not illustrated.

Piezoelectric-transducer driver circuit 73 includes input resistor 73a into which control pulse S60 is inputted. Input resistor 73a is connected to resistor 73b for preventing a short circuit and to the gate of power transistor (e.g., N-channel power MOSFET, hereinafter referred to as a "NMOS") 73c serving as the switching element. The two ends of resistor 73b are connected respectively to the gate and source of NMOS 73c. The drain of NMOS 73c is connected to 24-V DC power source 72 via inductor (coil) 73d. Capacitor 73e is connected in parallel between the drain and the source of NMOS 73c. Capacitor 73e and inductor 73d constitute a resonant circuit. Once control pulse S60 from high-voltage controller 60 is inputted into the gate of NMOS 73c via input resistor 73a, NMOS 73c switches 24-V DC, and then the resonant circuit makes the 24-V DC resonate. Thus, sinusoidal half-wave drive pulse S73 having the peak at approximately 100-V AC is outputted.

Primary-side input terminal 74a of piezoelectric transducer 74 is connected to the output side of the resonant circuit. High-voltage AC output voltage S74 in the range of 0 KV to 3 KV is outputted through secondary-side output terminal 74b of piezoelectric transducer 74 in accordance with the switching frequency of NMOS 73c. The output-voltage characteristics of secondary-side output terminal 74b vary depending upon the frequency and load 79 (i.e., cyan load 79C, magenta load 79M, yellow load 79Y, and black load 79K) of the electrical charger device. The boost ratio is determined by the combination of the switching frequency of NMOS 73c and load 79. AC output voltage S74 outputted from piezoelectric transducer 74 is controlled in such a manner that: piezoelectric transducer 74 is driven by a high frequency; AC output voltage S74 is raised by decreasing the drive frequency; and thereby, the target AC output voltage S74 is obtained.

Rectifier circuit 75 for AC/DC conversion is connected to output terminal 74b of piezoelectric transducer 74. Rectifier circuit 75 is a circuit configured to convert high-voltage AC output voltage S74, which is outputted through output terminal 74b of piezoelectric transducer 74, to high-voltage DC output voltage S75. Rectifier circuit 75 includes diodes 75a, 75b, and capacitor 75c. The output side of rectifier circuit 75 is connected to the shafts of the charger rollers of loads 79 (i.e., cyan load 79C, magenta load 79M, yellow load 79Y, and black load 79K) of the electrical charger devices of the four color via resistors 78-1, 78-2, 78-f 78-4, respectively. Current detector 76 is connected to the output side of piezoelectric transducer 74. Current detector 76 includes operational amplifier 76b. Operational amplifier 76b has a "+" input terminal into which 3.3-V DC supplied from 3.3-V DC power source 76a is inputted. A "−" input terminal of operational amplifier 76b is connected to the cathode of diode 75a in rectifier circuit 75. Resistor 76c of, for example, 13 kΩ is connected between the "−" input terminal and the output terminal of operational amplifier 76b. Hence, the currents (I) flowing through loads 79C, 79M, 79Y, 79K are converted to voltages ranging from 3.3 V to 0.0 V. A filter including both resistor 76d and capacitor 76e is connected to the output terminal of operational amplifier 76b for the purpose of smoothing the output voltage from the output terminal thereof. Output-current detection signal S76 is outputted through the filter, and is then inputted into input port IN14 of high-voltage controller 60. Output-current detection signal S76 is subjected to an analog/digital conversion (hereinafter, referred to as an "AD conversion") by the built-in ADC connected to input port IN14 of high-voltage controller 60, and thereby the values of the currents, ranging from 255 µA to 0 µA, flowing through loads 79C, 79M, 79Y, 79K are converted to values ranging from $00_{hex}$ to $FF_{hex}$.

In addition, output-voltage converter 77 is connected to the output side of rectifier circuit 75. Output-voltage converter 77 includes: voltage-divider resistors 77a, 77b; a filter including resistor 77d and capacitor 77e; and a voltage follower circuit including operational amplifier 77f. Voltage-divider resistors 77a, 77b divide high-voltage DC output voltage S75 of rectifier circuit 75, and convert the high-voltage DC output voltage S75 to a lower voltage. The filter smoothes the lower voltage. For example, a resistance value of voltage-divider resistor 77a is 200 MΩ, and a resistance value of voltage-divider resistor 77b is 274 kΩ. Opposite-direction clamp diode 77c is connected between ground GND and the connection point of voltage-divider resistors 77a, 77b. Clamp diode 77c is provided there for the purpose of preventing any negative voltage from being inputted into operational amplifier 77f when the high-voltage output voltage exceeds −2400 V. Output-voltage detection signal S77 is outputted through the output terminal of operational amplifier 77f, and is inputted into input port IN15 of high-voltage controller 60. Output-voltage detection signal S77 is subjected to an A/D conversion by the built-in ADC connected to input port IN15 of high-voltage controller 60, and the values of the output voltage ranging from −2400 V to 0 V are converted to values ranging from $000_{hex}$ to $FFF_{hex}$. It should be noted that an end of voltage-divider resistor 77b is connected to the "−" input terminal of operational amplifier 76b, so that the electric current that flows through output-voltage converter 77 can be cancelled.

(Configuration of High-Voltage Controller Built in High-Voltage Power-Supply Apparatus)

Figure 5:
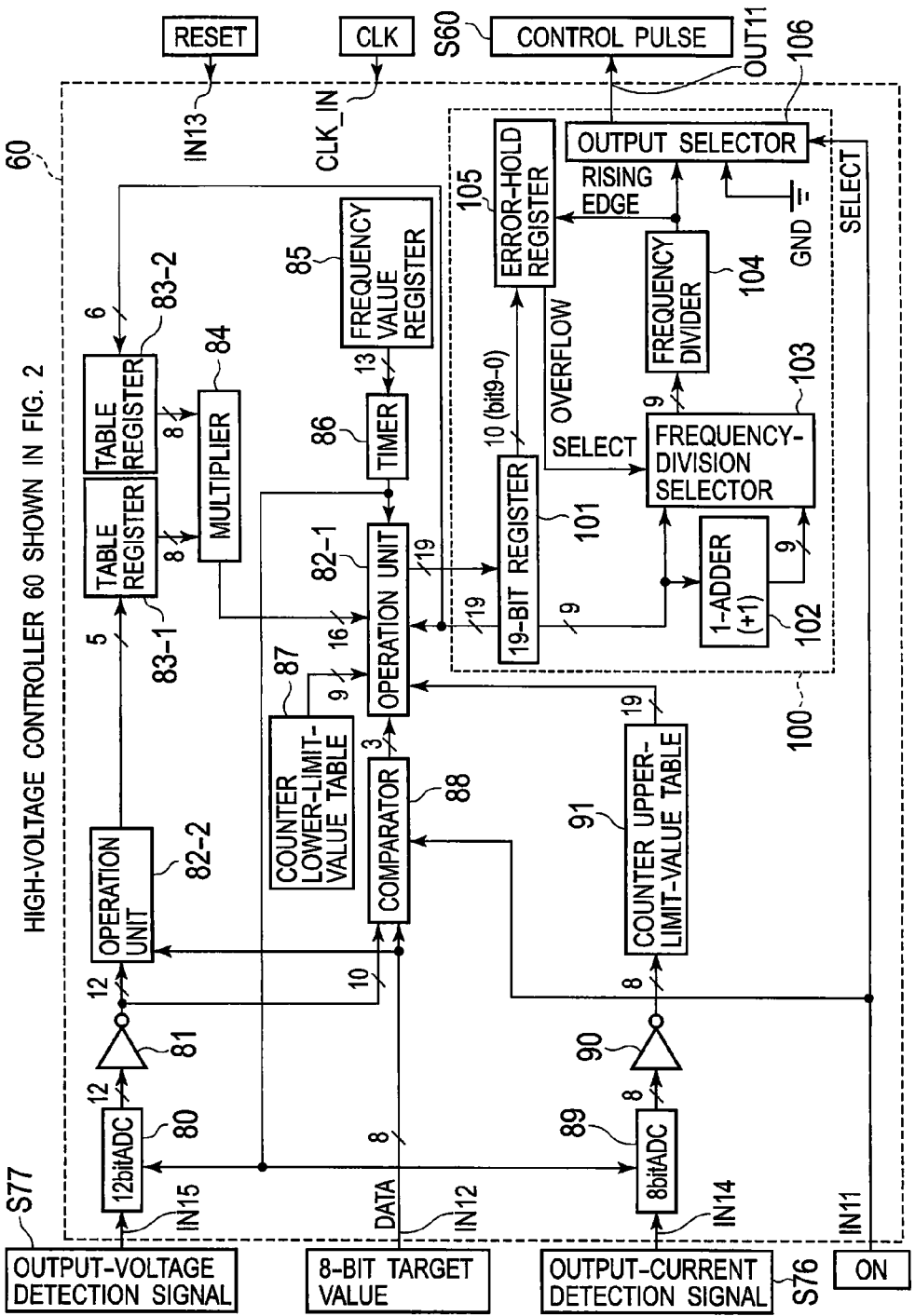
FIG. 5 is a configuration diagram showing high-voltage controller 60 shown in FIG. 2.

FIG. 5 is a configuration diagram showing high-voltage controller 60 shown in FIG. 2.

For example, high-voltage controller 60 is made from an ASIC, and high-voltage controller 60 using ASIC is fulfilled by programming the ASIC with a logic description language or the like. Clock CLK and reset signal RESET are inputted into high-voltage controller 60. Clock CLK is supplied to each of the circuit blocks, described later, which form synchronization circuits, and reset signal RESET is supplied to each circuit block for the purpose of initialization.

High-voltage controller 60 includes 12-bit ADC 80 that is connected to input port IN15. 12-bit ADC 80 is a circuit configured to convert output-voltage detection signal S77 (ranging from 0 V to 3.3 V) inputted through input port IN15 to a 12-bit digital value, and to then give the 12-bit digital value to inverter 81. Inverter 81 is a logic inversion element with a 12-bit input and a 12-bit output. Inverter 81 inverts "1" and "0" of data, and gives the result to operation unit 82-2. Operation unit 82-2 subtracts, from the 12-bit output value of inverter 81, an 8-bit target value corresponding to the target voltage expressed by data DATA inputted through input port IN12, and gives the 5-bit subtraction result to table register 83-1. By referring to the internal memory, table register 83-1 creates an 8-bit value from a value corresponding to the inputted 5-bit subtraction result, and outputs the 8-bit value thus created to multiplier 84. The other table register 83-2 is connected to the input side of multiplier 84.

Table register 83-2 receives the lowest 6 bits (=bit 16 to bit 11) of the highest 8 bits in the 19-bit value (=bit 18 to bit 0) stored in 19-bit register 101 configured to store a frequency set-up value. Table register 83-2 then creates an 8-bit value corresponding to the 6-bit value by referring to the internal memory, and outputs the 8-bit value thus created to multiplier 84. Multiplier 84 multiplies the 8-bit value inputted from table register 83-1 by the 8-bit value inputted from table register 83-2, creates a 16-bit value from the multiplication result, and outputs the 16-bit value to frequency-division-ratio setup unit (e.g., operation unit) 82-1. The input side of timer 86 is connected to operation unit 82-1. Timer 86 includes a subtraction counter which refers to a value 7000 ($1B58_{hex}$) stored in frequency value register 85 and gradually decreases the internal 13-bit count value from 1B58 to 1B57, to 1B56, ..., to 0003, to 0002, to 0001, and to 0000. Once the 13-bit count value reaches 0000, the subtraction counter loads the initial value of $1B58_{hex}$. Timer 86 counts clock CLK by the 13-bit count value, and outputs a pulse signal in a 140-µsec cycle. The pulse signal thus outputted is inputted into operation unit 82-1, 12-bit ADC 80, and 8-bit ADC 89, and is used as trigger signals to start operations and AD (analog to digital) conversion.

Operation unit 82-1 performs the operation shown below in accordance with the 3-bit value inputted from comparator 88, and updates the value of 19-bit register 101 in binarized-pulse output generator 100 configured to binarize the frequency division ratio:

if the output value of comparator 88 is 000b, 16-bit output value of multiplier 84 is added to the value of 19-bit register 101;

if the output value of comparator 88 is 001b, "1" is added to the value of 19-bit register 101;

if the output value of comparator 88 is 010b, the value of the value of 19-bit register 101 is not updated;

if the output value of comparator 88 is 011b, "1" is subtracted from the value of 19-bit register 101; and if the output value of comparator 88 is 100b, the 16-bit output value of multiplier 84 is subtracted from the value of 19-bit register 101.

If reset signal RESET is inputted, 19-bit register 101 is initialized by: using the 9-bit value of lower-limit-value setup unit (e.g., counter lower-limit-value table) 87 as the highest 9 bits; and giving $000_{hex}$ as the lowest 10 bits. In addition, at the time of updates by the addition or subtraction described above, operation unit 82-1 compares the 9-bit output value of counter lower-limit-value table 87 and the 19-bit output value of upper-limit-value setup unit (e.g., counter upper-limit-value table) 91 in the following way.

If the 19-bit operation result is less than (<) the highest: a 9-bit counter lower limit value +the lowest 10 bits: $000_{hex}$, the update value of 19-bit register 101 is made to be:

the highest: the 9-bit counter lower limit value +the lowest 10 bits: $000_{hex}$.

If the 19-bit operation result is greater than (>) the 19 bits of counter upper-limit-value table 91, the update value of 19-bit register 101 is made to be the 19-bit value of counter upper-limit-value table 91.

8-bit ADC 89 converts the inputted voltage value, ranging from 0 V to 3.3 V, of output-current detection signal S76 to an 8-bit value ranging from $FF_{hex}$ to $00_{hex}$, and then outputs the 8-bit value to inverter 90. Inverter 90 inverts the 8-bit output value of 8-bit ADC 89, and outputs the resultant value to counter upper-limit-value table 91.

Comparator 88 is connected to input port IN12 and compares the 8-bit target value expressed by inputted data DATA with the highest 10-bit input value obtained through the inversion of the output value of 12-bit ADC 80 by inverter 81. Then, comparator 88 outputs a 3-bit value determined as shown below to operation unit 82-1.

If the 10-bit value obtained by adding the lowest 2-bit value 00b to (the 8-bit target value −1) is equal to or greater than (>) the highest 10-bit output value of inverter 81, the 3-bit output value is 000b.

If the 10-bit value obtained by adding the lowest 2-bit value 00b to the 8-bit target value is greater than (>) the highest 10-bit output value of inverter 81 which is greater than (>) the 10-bit value obtained by adding the lowest 2-bit value 00b to (the 8-bit target value −1), the 3-bit output value is 001b.

If the 10-bit value obtained by adding the lowest 2-bit value 00b to the 8-bit target value =the highest 10-bit output value of inverter 81, the 3-bit output value is 010b.

If the 10-bit value obtained by adding the lowest 2-bit value 00b to (the 8-bit target value +1) >the highest 10-bit output value of inverter 81 >the 10-bit value obtained by adding the lowest 2-bit value 00b to the 8-bit target value, the 3-bit output value is 011b.

If the highest 10-bit output value of inverter 81 <the 10-bit value obtained by adding the lowest 2-bit value 00b to (the 8-bit target value +1), the 3-bit output value is 100b.

In addition, if the ON-signal ON inputted through input port IN11 is logical "L," comparator 88 outputs a 3-bit output value of 100b to operation unit 82-1.

Counter upper-limit-value table 91 receives an 8-bit value obtained through the inversion of the 8-bit output value of 8-bit ADC 89 by inverter 90, and outputs a 19-bit value, which represents the frequency lower limit value, to operation unit 82-1.

19-bit register 101 in binarized-pulse output generator 100 is a 19-bit register whose value is updated by operation unit 82-1 and which holds the frequency setup value. In 19-bit register 101, the highest 9 bits represent the integer portion of the frequency division ratio, and the lowest 10 bits represent the fractional portion corresponding to the 19-bit register value divided by 1024 (value/1024). Of the 19-bit value of 19-bit register 101, the lowest 10 bits are outputted to error-hold register 105, and the highest 9-bit value is outputted to frequency-division selector 103 and to 1-adder (+1) 102.

Error-hold register 105 receives the lowest 10-bit value of 19-bit register 101. Then, error-hold register 105 adds the lowest 10-bit value to the 10 bit value of the error-hold-register held value at every rise edge of the pulse signal outputted from frequency division unit (e.g., frequency divider) 104. Then, error-hold register 105 updates the error-hold-register held value with the addition result. In addition, if an overflow occurs at the time of the addition, error-hold register 105 outputs a logical "H" to frequency-division selector 103, and otherwise outputs a logical "L" to frequency-division selector 103.

1-adder (+1) 102 adds 1 to the 9-bit value inputted from 19-bit register 101, and then outputs the resultant 9-bit value to frequency-division selector 103. Frequency-division selector 103 receives the highest 9-bit value of 19-bit register 101 and the 9-bit value of 1-adder (+1) 102. Then, if selection signal Select, inputted from error-hold register 105, is logical "H," frequency-division selector 103 outputs, to frequency divider 104, the 9-bit value inputted from 1-adder (+1) 102. If selection signal Select is logical "L," frequency-division selector 103 outputs, to frequency divider 104, the 9-bit value inputted from 19-bit register 101. Frequency divider 104 counts the 9-bit value inputted from frequency-division selector 103, and outputs control pulse S60 with a 30% on-duty cycle to output selector 106 in a cycle of 9-bit value×20 nsec (note that 20 nsec is the cycle of clock CLK). The 30% value is the sum of the ¼ value of the 9-bit output value, plus the $\frac{1}{32}^{nd}$ value thereof, and $\frac{1}{64}^{th}$ value thereof. To put it differently, the 30% value is the sum of: a value obtained by shifting the 9-bit output value of frequency-division selector 103 rightwards by 2 bits; another value obtained by shifting the same 9-bit output value rightwards by 5 bits; and the other value obtained by shifting the same 9-bit output value rightwards by 6 bits. Output selector 106 receives ON-signal ON as selection signal Select. If selection signal Select is logical "H," output selector 106 outputs control pulse S60 inputted from frequency divider 104, as it is, to output port OUT11. If selection signal Select is logical "L," output selector 106 outputs the potential of ground GND (=0) to output port OUT11.

(Overall Operations of Image Formation Apparatus)

In FIGS. 3 and 4, once print data described in PDL (page description language) or the like are inputted into image formation apparatus 1 from an external device, which is not illustrated, via host interface unit 50, the print data are converted to bitmap data (image data) by command/image processor 51, and the bitmap data are sent to LED-head interface unit 52 and printer-engine controller 53. Printer-engine controller 53 controls heater 59 in image-fixation unit 18 in accordance with the detection value of thermistor 65. Once the temperature of the thermal fixation roller in image-fixation unit 18 reaches a predetermined temperature, the action of the printing is started. While the printing is being done, high-voltage DC output voltage S75—a high-voltage DC electrically-charge bias outputted from high-voltage power-supply apparatus 70 that forms a part of electrically-charge bias generator 61—and a high-voltage DC development bias outputted from development-supply bias generator 62 are applied to development units 2K, 2Y, 2M, 2C of the four colors. In addition, a high-voltage DC image-transfer bias outputted from image-transfer bias generator 63 is applied to image-transfer rollers 5K, 5Y, 5M, 5C of the four colors.

Sheets of paper 15 set in sheet-feeder cassette 13 are fed by hopping roller 14. At a timing synchronized with the image formation operation, which is to be described later, register rollers 16, 17 transport each sheet of paper 15 onto image-transfer belt 8. In development units 2K, 2Y, 2M, 2C of the four colors, toner images are formed on photosensitive drums 32K, 32Y, 32M, 32C, respectively, by an electrophotographic process. While the toner images are being formed, LED heads 3K, 3M, 3Y, 3C are made to emit light in accordance with the bitmap data. The toner image developed by development unit 2K, 2Y, 2M, 2C of the four colors are transferred onto sheet of paper 15 being transported on image-transfer belt 8. The transfers of the developed toner images are performed by applying high-voltage DC image-transfer biases to image-transfer rollers 5K, 5Y, 5M, 5C. After the toner images of the four colors are transferred to sheet of paper 15, image-fixation unit 18 fixes the transferred image to sheet of paper 15. The resultant sheet of paper 15 is then discharged out.

(Operations of High-Voltage Power-Supply Apparatus)

Figure 6:
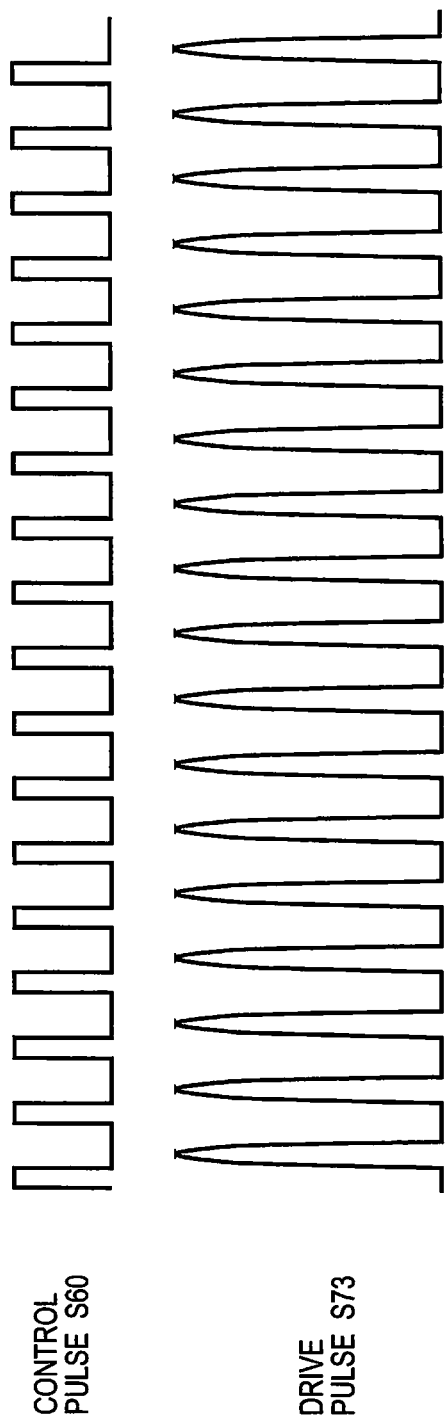
FIG. 6 is a waveform chart showing control pulse S60 outputted from high-voltage controller 60 shown in FIG. 1 and drive pulse S73 outputted from piezoelectric transducer driver circuit 73.

FIG. 6 is a waveform chart showing control pulse S60 outputted from high-voltage controller 60 shown in FIG. 1 and drive pulse S73 outputted from piezoelectric transducer driver circuit 73. FIG. 7 is a table showing the input values into and the output values from table register 83-1 shown in FIG. 5. FIG. 8 is a table showing the input values into and the output values from table register 83-2 shown in FIG. 5. FIGS. 9-1 and 9-2 are tables showing the input values into and the output values from counter upper-limit-value table 91 shown in FIG. 5. FIGS. 10-1 and 10-2 are tables showing the relationship between the electric-current value and the limit frequency value of counter upper-limit-value table 91 shown in FIG. 5. FIG. 11 is a table showing drive frequencies and corresponding values of DC output voltage S75 in high-voltage power-supply apparatus 70 shown in FIG. 2 with no load, a 20-MΩ load, a 10-MΩ load and a 5-MΩ load. FIG. 12 is a table showing electric-current values corresponding to the values of DC output voltage S75 shown in FIG. 11. FIG. 13 is a table showing relations of each of the values of DC output voltage S75 with output-voltage detection signal S77 inputted into 12-bit ADC 80, a detection value of 12-bit ADC 80, a 12-bit input value into operation unit 82-2, a 10-bit input value into comparator 88, and a corresponding 8-bit target value expressed by data DATA in FIG. 5. FIG. 14 is a graph corresponding to FIG. 11.

The operations of high-voltage power-supply apparatus 70 according to the first embodiment are described below by referring to FIGS. 6 to 14.

Firstly, the overall operations of high-voltage power-supply apparatus 70 shown in FIG. 1 are described.

In the first embodiment, a description is given of high-voltage power-supply apparatus 70 with four outputs corresponding to electrically-charge bias generator 61. The four outputs are four distributions from the same electrically-charge bias (i.e., high-voltage DC output voltage S75). The electrically-charge bias (i.e., high-voltage DC output voltage S75) is controlled so that the electrically-charge bias should stay within a range of, for example, −800 V to −1200V. Each of development units 2K, 2Y, 2M, 2C serving as load 79 of the electrically-charge bias ranges from 0 µA to 60 µA for each single output. Each of development units 2K, 2Y, 2M, 2C can be set singularly or in combination with others (up to three others) as the user wants. In the black monochrome mode, the printing operation is possible without any color development units 2Y, 2M, 2C set in the image formation apparatus. Hence, electrically-charge-bias load 79 ranges from 30 µA to 120 µA even as the rated load, and the required output range is from 0 µA to 240 µA.

Printer-engine controller 53 starts the control on the application of an electrically-charge bias at the same time when drum motors 58K, 58Y, 58M, 58C drive to rotate photosensitive drums 32K, 32Y, 32M, 32C. Printer-engine controller 53 continues the control on the application of the electrically-charge bias until the rotation of photosensitive drums 32K, 32Y, 32M, 32C is stopped. When the electrically-charge bias is applied, printer-engine controller 53 outputs "L" reset signal RESET to high-voltage controller 60, and thereby resets various settings in high-voltage controller 60. Then, printer-engine controller 53 outputs, to high-voltage controller 60, 8-bit-value data DATA corresponding to the target voltage value of high-voltage DC output voltage S75. The relationship between DC output voltage S75 and data DATA is a value indicated by DC output voltage S75 and a corresponding 8-bit target value shown in FIG. 13. When DC output voltage S75 ranges from −800V to −1200V, 8-bit-value data DATA ranges from $55_{hex}$ to $80_{hex}$.

After printer-engine controller 53 outputs target-voltage data DATA to high-voltage controller 60, printer-engine controller 53 switches ON-signal ON to be outputted to high-voltage controller 60 from "L" to "H" at a predetermined timing of applying the electrically-charge bias. If inputted ON-signal ON becomes "H," high-voltage controller 60 immediately outputs control pulse S60 with a variable drive frequency through output port OUT11 to piezoelectric transducer driver circuit 73. Piezoelectric-transducer driver circuit 73 applies sinusoidal half-wave drive pulse S73 with a peak value of approximately 100 V to the primary-side input terminal of piezoelectric transducer 74 by switching the 24-V DC supplied from DC power source 72. FIG. 6 shows a waveform chart for control pulse S60 with the variable drive frequency and drive pulse S73.

If drive pulse S73 is inputted into piezoelectric transducer 74, piezoelectric transducer 74 raises the voltage of drive pulse S73, and then outputs a resultant high-voltage AC output voltage S74 corresponding to the drive frequency through its secondary-side output terminal to rectifier circuit 75. Rectifier circuit 75 makes the diodes and the capacitor rectify the inputted high-voltage AC output voltage S74, and then outputs the resultant negative high-voltage DC output voltage S75 to load 79.

Current detector 76 supplies an electric current to rectifier circuit 75, converts the current to a voltage, and then outputs output-current detection signal S76 thus created to input port IN14 (input port for ADC) of high-voltage controller 60. Output-voltage converter 77 outputs output-voltage detection signal S77 to input port IN 15 (input port for ADC) of high-voltage controller 60. Output-voltage detection signal S77 is obtained by converting, to a positive low voltage ranging from 0 V to 3.3 V, the negative high-voltage DC output voltage S75 outputted from rectifier circuit 75. Load 79 is connected to the output side of rectifier circuit 75. To put it differently, the metal cores of the 4ch charger rollers 36K, 36Y, 36M, 36C are connected to the output side of rectifier circuit 75 via, for examples, resistors. When electrically charged, photosensitive drums 32K, 32Y, 32M, 32C become load 79.

High-voltage controller 60 converts, to an 8-bit digital value, output-current detection signal S76 ranging from 3.3 V to 0.0 V and inputted through input port IN14 for ADC. In accordance with this converted detection value, high-voltage controller 60 limits the drive frequency range of control pulse S60 which is to be outputted through output port OUT11. In addition, high-voltage controller 60 converts, to a 12-bit digital value, output-voltage detection signal S77 ranging from 3.3 V to 0.0 V and inputted through input port IN15 for ADC. The converted detection values are shown in FIG. 13. High-voltage controller 60 controls the drive frequency of control pulse S60, outputted through output port OUT11, in a manner that an inverted value of the highest 8 bits of the detection value, which is obtained by ignoring the lowest 4 bits of the detection value, can be equal to the 8-bit value of data DATA. In this way, high-voltage controller 60 performs the feedback control on the drive frequency by using output-voltage detection signal S77 of output-voltage converter 77, and controls the control range of the drive frequency by using output-current detection signal S76 of current detector 76.

Next, a description is given of details of the operations of high-voltage power-supply apparatus 70 shown in FIG. 2.

Oscillator 71 outputs clock CLK of 50 MHz, which is then inputted into input port CLK_IN of high-voltage controller 60. High-voltage controller 60 resets its various internal settings when reset signal RESET inputted from printer-engine controller 53 through input port IN13 becomes "L." High-voltage controller 60 outputs control pulse S60 whose on-duty cycle is 30% of that of the initial drive frequency (e.g., 130 KHz) through output port OUT11 when ON-signal ON inputted from printer-engine controller 53 through input port IN11 switches from "L" to "H." The outputted control pulse S60 passes through resistor 73a, and is then inputted into the gate of NMOS 73c. Resistor 73b plays a role in letting out the electrical charges to ground GND, before the initialization of high-voltage controller 60 and when the gate voltage of NMOS 73c becomes "L." Once control pulse S60 makes NMOS 73c perform an ON/OFF action, a resonant circuit that includes DC power source 72, inductor 73d, capacitor 73e and piezoelectric transducer 74 is driven, so that sinusoidal half-wave drive pulse S73 with peaks of approximately 100 V shown in FIG. 6 is applied to the primary-side input terminal 74a of piezoelectric transducer 74.

Thereby, piezoelectric transducer 74 is driven. Piezoelectric transducer 74 outputs raised AC output voltage S74 through secondary-side output terminal 74b. AC output voltage S74 is rectified by diodes 75a, 75b and capacitor 75c of rectifier circuit 75, and thus becomes negative DC output voltage S75. Outputted DC output voltage S75 passes through resistors 78-1 to 78-4, and is then applied to: load 79C including cyan charger roller 36C and cyan photosensitive drum 32C; load 79M including magenta charger roller 36M and magenta photosensitive drum 32M; load 79Y including yellow charger roller 36Y and yellow photosensitive drum 32Y; and load 79K including black charger roller 36K and black photosensitive drum 32K.

Load 79C to 79K can be set in any arbitrarily determined combination. Metal contacts are provided to connect load 79C to 79K. If any of loads 79C to 79K is not set, the load is released at a point beyond the corresponding one of resistors 78-1 to 78-4. If none of development units 2C to 2K serving respectively as loads 79C to 79K are set at all, it is not possible to perform the printing. In this case, image formation apparatus 1 displays an error message on an operation panel, which is not illustrated.

Current detector 76 performs a current/voltage conversion on the electric current flowing through rectifier circuit 75 by using: operational amplifier 76b to which a DC 24 V (not illustrated) is supplied, and 13-k$\Omega$ resistor 76c. The converted voltage is smoothed by a filter including resistor 76d and capacitor 76e. 3.3-V DC power source 76a is connected to the "+" input terminal of operational amplifier 76b. The voltage of the "−" input terminal of operational amplifier 76b becomes 3.3 V, so that: the electric current flowing through rectifier circuit 75 is supplied from the output terminal of operational amplifier 76b via resistor 76c; and the voltage of the output terminal of operational amplifier 76b drops in accordance with the supplied electric current. The electric current flowing through resistors 77a, 77b included in output-voltage converter 77 flows with opposite polarity to rectifier circuit 75, and therefore is cancelled out. Hence, the electric current flowing through resistor 76c becomes equal to the electric currents flowing through loads 79C to 79K. If the electric current is 0 $\mu$A, the output voltage of operational amplifier 76b is 3.3 V. If the electric current is 255 $\mu$A, the output voltage of operational amplifier 76b is 0 V. Resistor 76c precisely has a resistance of 12.94 k$\Omega$, but there is an error margin of ±0.5%. For this reason, the following description is based on an assumption that: the resistance is 13 k$\Omega$; the output voltage ranges from 3.3 V to 0.00 V; and the corresponding values of electric current range from 0 $\mu$A to 255 $\mu$A.

Using 200-M$\Omega$ resistor 77a and 274-k$\Omega$ resistor 77b, output-voltage converter 77 divides the 3.3 V of the "−" input terminal of operational amplifier 76b and the negative voltage of DC output voltage S75 of rectifier circuit 75. Output-voltage converter 77 outputs the resultant voltage via a filter that includes resistor 77d and capacitor 77e, and with the high impedance of the circuit converted to a low impedance by using the voltage follower of operational amplifier 77f. Operational amplifier 77f is supplied with a DC 24 V by a power source, which is not illustrated. The relationship between DC output voltage S75 of rectifier circuit 75 and output-voltage detection signal S77 outputted from operational amplifier 77f is shown in FIG. 13. If DC output voltage S75 becomes higher than −2400 V, DC output voltage S75 is clamped at 0 V by diode 77c.

High-voltage controller 60 receives an 8-bit value of 8-bit data DATA in a range of $55_{hex}$ to $80_{hex}$ corresponding to −800 V to −1200 V through input port IN12, and controls the drive frequency of control pulse S60 to be outputted through output port OUT11 in order that the AD-converted detection value of output-voltage detection signal S77 inputted through input port IN15 can be within a range of $AAA_{hex}$ to $7FF_{hex}$; or in other words, output-voltage detection signal S77 can be within a range of 2.20 V to 1.65 V. FIG. 14 is a graph showing the relationships between the drive frequency of control pulse S60 and DC output voltage S75 in high-voltage power-supply apparatus 70 with no load, 20-M$\Omega$ load, 10-M$\Omega$ load, and 5-M$\Omega$ load. The values in the graph of FIG. 14 are listed in the table of FIG. 11. In addition, the values of the electric currents corresponding to the values of DC output voltage S75 shown in FIG. 11 are listed in the table of FIG. 12. In the graph of FIG. 14, the maximum DC output voltage S75 with no load is −12 kV. This value, however, is provided only for the purpose of explaining the characteristics. In the first embodiment, no output of such a high voltage is allowed by the control to be described later. The resonant frequency of piezoelectric transducer 74 at which the maximum DC output voltage S75 is generated varies depending on loads 79C to 79K. The control range is shifted in accordance with output-current detection signal S76 outputted from current detector 76, so that the control is always performed within a range not lower than the resonant frequency of piezoelectric transducer 74 corresponding to loads 79C to 79K. By using output-voltage detection signal S77 detected by output-voltage converter 77, high-voltage controller 60 performs the control to lower the drive frequency of control pulse S60 when the absolute value of the voltage of output-voltage detection signal S77 is lower than the absolute value of the target voltage, and otherwise to raise the drive frequency of control pulse S60.

(Operations of High-Voltage Controller in High-Voltage Power-Supply Apparatus)

A description is next given of the operations of high-voltage controller 60 shown in FIG. 5 and provided in high-voltage power-supply apparatus 70.

High-voltage controller 60 is operated in synchronization with 50-MHz clock CLK inputted through input port CLK_IN. When ON-signal ON inputted through input port IN11 switches from "L" to "H," selection signal Select makes output selector 106 output control pulse S60, which make piezoelectric transducer driver circuit 73 drive piezoelectric transducer 74 at an initial drive frequency of 130 MHz. Then, output-voltage detection signal S77, outputted from output-voltage converter 77, is subjected to the AD conversion performed by 12-bit ADC 80. Then, operation unit 82-1 performs an addition on the value of 9-bit register 101 in a manner such that a value, obtained by the inversion performed by inverter 81 to invert the highest 8 bits of the AD-conversion result, can be equal to the 8-bit target value of data DATA outputted from printer-engine controller 53. Binarized-pulse output generator 100 makes frequency divider 104 output a pulse in a manner that the outputted pulse can be the average frequency-division ratio of {the highest 9-bit value+(the lowest 10-bit value/1024)} of the value stored in 19-bit register 101. Thus, the pulse is controlled so that the pulse can be at the target voltage. Simultaneously, output-current detection signal S76 inputted from output current detector 76 through input port IN14 is converted to a digital value by 18-bit ADC 89. The digital value is inverted by inverter 90. Counter upper-limit-value table 91 outputs, to operation unit 82-1, a value equivalent to the drive frequency lower limit that corresponds to the load current, i.e., the resultant value obtained by the inversion. The output from counter upper-limit-value table 91 makes operation unit 82-1 limit the control range of the frequency-division ratio.

The operations of high-voltage controller 60 shown in FIG. 5 are described in detail below.

Printer-engine controller 53 inputs reset signal RESET of "L" into high-voltage controller 60. Operation unit 82-1 sets a 19-bit value of $60000_{hex}$ in 19-bit register 101 by using the 9-bit value of $180_{hex}$ set in counter lower-limit-value table 87 as the highest 9 bits and by using $000_{hex}$ as the lowest 10 bits. All of error-hold register 105 is cleared to zero.

Before the output of the high voltage, ON-signal ON is "L," and output selector 106 outputs "L" on the basis of selection signal Select of "L." For this reason, piezoelectric transducer 74 is not driven in this case. Comparator 88 outputs a 3-bit value of 100b to operation unit 82-1 once ON-signal ON of "L" is inputted into Comparator 88. Because 100b is inputted into operation unit 82-1, operation unit 82-1 performs a subtraction. Since the value of 19-bit register 101 is $60000_{hex}$ and the output value of multiplier 84, which is to be described later, is the positive 16-bit value and is always equal to or greater than $0001_{hex}$, the result of the subtraction performed by operation unit 82-1 is smaller than $60000_{hex}$. When the subtraction is performed, operation unit 82-1 compares the highest 9 bits of the subtraction result with a 9-bit value of $180_{hex}$ of counter lower-limit-value table 87. If the value of the highest 9 bits is smaller than the 9-bit value of $180_{hex}$, the value of 19-bit register 101 is set at $60000_{hex}$. As a consequence, as long as ON-signal ON is "L," the value of 19-bit register 101 continues to be held at $60000_{hex}$.

In binarized-pulse output generator 100, a value of the highest 9 bits of 19-bit register 101, that is, the integer portion of the frequency-division ratio, and a value obtained by making 1-adder (+) 102 add 1 to the integer portion of the frequency-division ratio, are inputted into frequency-division selector 103. The value N and the value N+1 are inputted into frequency-division selector 103, where the highest 9-bit value of 19-bit register 101 is denoted, for example, by N. On the basis of selection signal Select outputted from error-hold register 105, frequency-division selector 103 selects either the value N or the value N+1, and gives the selected one to the frequency divider 104. Hence, at the pulse cycle of 1024 for the output pulse from frequency divider 104, N-frequency division is performed M times, and (N+1) frequency division is performed (1024−M) times. The control is performed in a manner that:

$$\{N \times M + (N+1) \times (102-M)\}/1024 = \text{the highest 9-bit value+(the lowest 10-bit value/1024)} \tag{1}$$

As long as the value of 19-bit register 101 remains unchanged, the same control is performed as described earlier. As the value of 19-bit register 101 varies, the value changes at a pulse cycle that is shorter than the 1024-pulse cycle. Nevertheless, the average value of the left-hand side of the equation (1) for each unit time becomes almost equal to the average value of the right-hand side of the equation (1) for each unit time.

FIG. 15 is a flowchart showing the operations of error-hold register 105 shown in FIG. 5. By following the flowchart, a description is given of the operations of error-hold register 105 to which the lowest 10-bit value of 19-bit register 101 is inputted. It should be noted that although the description is based on the flowchart of FIG. 15, the circuit is implemented by using hardware.

In step ST10, the operations of error-hold register 105 are started. It is judged in step ST11 whether or not a rising edge of frequency divider 104 is detected. If a rising edge is detected (Y), the process proceeds to step ST12t. If otherwise (N), the process returns to step ST11.

It is judged in step ST12 whether or not an 11-bit value obtained by adding the lowest 10-bit value of 19-bit register 101 to the 10-bit value of error-hold register 105 is larger than $3FF_{hex}$:

(A00-09)+(G00-09)>$3FF_{hex}$ where (A00-09) is the lowest 10-bit value of 19-bit register 101 and (G00-09) is the 10-bit value of error-hold register 105.

If the judgment result says that the 11-bit value obtained in the above-described manner is larger than $3FF_{hex}$ (Y), the process proceeds to step ST13. If otherwise (N), the process proceeds to step ST14. In step ST13, error-hold register 105 outputs selection signal Select of "H," and frequency-division selector 103 outputs, to frequency divider 104, the 9-bit value inputted from 1-adder (+) 102. Then, the process proceeds to step ST15. Alternatively, in step ST14, error-hold register 105 outputs selection signal Select of "L," and frequency-division selector 103 outputs, to frequency divider 104, the 9-bit value inputted from 19-bit register 101. Then, the process proceeds to step ST15.

In step ST15, the 10-bit value of error-hold register 105 is updated with a 10-bit value obtained by adding the lowest 10-bit value of 19-bit register 101 to the 10-bit value of error-hold register 105. Then, the process returns to step ST11.

Once the operations in FIG. 15 are performed, frequency divider 104 in the initialized state receives a 9-bit value of $180_{hex}$ and outputs control pulse S60 whose on-duty cycle is 30% of that of the one-384th frequency. Since ON-signal ON is "L," control pulse S60 outputted from frequency divider 104 is only sent to error-hold register 105. In this case, error-hold register 105 holds a value of $000_{hex}$.

Output-current detector 76 in the high-voltage-output off state outputs a 3.3-V output-current detection signal S76 to 8-bit ADC 89 in high-voltage controller 60. 8-bit ADC 89 performs an AD conversion on 3.3-V output-current detection signal S76 and outputs an 8-bit value of $FF_{hex}$ at the pulse cycle inputted from timer 86. Timer 86 receives a 13-bit value of 7000 ($1B58_{hex}$) held in frequency register 85, and outputs a pulse of 140 μsec (7000×20 nsec) to 8-bit ADC 89. Hence, 8-bit ADC 89 performs an AD conversion at a 140-μsec cycle and outputs the output value of $FF_{hex}$ as the conversion result to inverter 90. Inverter 90 inverts the inputted output value of $FF_{hex}$, and outputs an 8-bit value of $00_{hex}$ to counter upper-limit-value table 91.

Counter upper-limit-value table 91 holds the values listed in the tables shown in FIGS. 9-1 and 9-2. If the input value is $00_{hex}$, a 19-bit value of $6E9E9_{hex}$ is outputted to operation unit 82-1. The highest 9 bits of the 19-bit value of $6E9E9_{hex}$ are $1BA_{hex}$ (442), and the lowest 10 bits of the 19-bit value of $6E9E9_{hex}$ are $1E9_{hex}$ (489). The 19-bit value of $6E9E9_{hex}$ corresponds to a frequency-division ratio of 442.48=442+ (489/1024), which corresponds to a frequency of 113 kHz. Operation unit 82-1 limits the control frequency range to within a range of the lower limit value to the upper limit value, that is to say, within a range of 130 kHz to 113 kHz. The 8-bit target value in the initialized state is "L," and operation unit 82-1 outputs $60000_{hex}$.

Output-voltage converter 77 in the high-voltage-output off state outputs a 3.3-V output-voltage detection signal S77 to 12-bit ADC 80 in high-voltage controller 60. 12-bit ADC 80 performs an AD conversion on 3.3-V output-voltage detection signal S77, and outputs a 12-bit value of $FFF_{hex}$ to inverter 81. Inverter 81 inverts the inputted 12-bit value, and outputs a value of $000_{hex}$ to operation unit 82-2.

Operation unit 82-2 performs an operation on the inputted 12-bit value, and outputs a 5-bit value to table register 83-1. Operation unit 82-2 includes a divider circuit, and performs operations at a cycle of a predetermined number. The operation is performed on the 5-bit output value of operation unit 82-2 at a predetermined cycle that is not longer than 140 μsec, which is the output cycle of timer 86. However, the 140 μsec does not have to be synchronized with the operation cycle of operation unit 82-2.

FIG. 16 is a flowchart showing the operations of operation unit 82-2 shown in FIG. 5.

In step ST20, the operations of operation unit 82-2 are started. Then, it is judged in step ST21 whether or not the 12-bit output value of inverter 81≠$000_{hex}$. If the 12-bit output value of inverter 81≠$000_{hex}$ (Y), the process proceeds to step ST22. If otherwise (N), the process proceeds to step ST23. It is judged in step ST22 whether or not the 8-bit target value (target setup value) represented by data DATA=$00_{hex}$. If the 8-bit target value (target setup value)=$00_{hex}$ (Y), the process proceeds to step ST24. If otherwise (N), the process proceeds to step ST25. In step 23, operation unit 82-2 outputs a 5-bit output value as $00_{hex}$, and then in step ST30, the operations are finished.

It is judged in step ST24 whether or not the 12-bit output value of inverter 81 is larger than $01F_{hex}$. If the 12-bit output value of inverter 81 is larger than $01F_{hex}$ (Y), the process proceeds to step ST26. If otherwise (N), the process proceeds to step ST27. It is judged in step ST25 whether or not the value obtained by dividing the 12-bit output value of inverter 81 by the 8-bit target value (target setup value)—i.e., the value of a division of the integers—is larger than $01F_{hex}$. If the value is larger than $01F_{hex}$ (Y), the process proceeds to step ST28. If otherwise (N), the process proceeds to step ST29.

In step ST26, operation unit 82-2 outputs a 5-bit output value as $1F_{hex}$, and then finishes the operations in step ST30. In step ST27, operation unit 82-2 outputs, as a 5-bit output value, the lowest 5 bits of the 12-bit output value of inverter 81, and then finishes the operations in step ST30. In step ST28, operation unit 82-2 outputs a 5-bit output value as $1F_{hex}$, and then finishes the operations in step ST30. In step ST29, operation unit 82-2 outputs the lowest 5 bits of the integer portion of the result obtained by dividing the 12-bit output value of inverter 81 by the 8-bit target value (target setup value), and then finishes the operations in step ST30.

In the initial state, the process at step ST23 shown in FIG. 16 is performed, and operation unit 82-2 outputs the lowest 5-bit output value of $00_{hex}$ of inverter 81.

As shown in FIG. 5, if the 8-bit target value is equal to the sixteenfold value thereof, operation unit 82-2 outputs a 5-bit value of $10_{hex}$ to table register 83-1. To put it differently, if the 8-bit target value is equal to the highest 8 bits of the value obtained by making inverter 81 invert the value detected by 12-bit ADC 80, operation unit 82-2 outputs $10_{hex}$. The output value of operation unit 82-2 ranges from $00_{hex}$ to $1F_{hex}$. If the output value is $00_{hex}$, the output is lower than the target voltage. As the output value increases from $01_{hex}$ to $0F_{hex}$, that is, approaches $10_{hex}$, the output is still lower than the target voltage, but approaches the target voltage. If, in contrast, the output value is $1F_{hex}$, the output is higher than target voltage. As the output value decreases from $1F_{hex}$ to $11_{hex}$, that is, approaches $10_{hex}$, the output is still higher than the target voltage, but approaches the target voltage.

Table register 83-1 receives a 5-bit output value of operation unit 82-2, and outputs an 8-bit value to multiplier 84. FIG. 7 shows the input values of table register 83-1 and their corresponding output values. According to FIG. 7, the 8-bit value corresponding to the 5-bit value of $00_{hex}$ is $80_{hex}$.

Table register 83-2 receives 6 bits (from bit 16 to bit 11) of the 19-bit value (from bit 18 to bit 0) of 19-bit register 101, and outputs, to multiplier 84, an 8-bit value corresponding to the 6 bits. FIG. 8 shows various input values and their corresponding output values. According to FIG. 8, in the initial state, the 6-bit value is $00_{hex}$, and the output value is $80_{hex}$.

Multiplier 84 multiplies the 8-bit output value of table register 83-1 by the 8-bit output value of table register 83-2, and outputs the 16-value of the multiplication result to operation unit 82-1. Multiplier 84 multiplies the above-mentioned values and outputs, in the initial state, $4000_{hex}$.

Subsequently, printer-engine controller 53 outputs, to high-voltage controller 60, an 8-bit target value equivalent to the target voltage. If, for example, the target voltage is −1200 V, the 8-bit target value is $80_{hex}$. Since the value detected by 12-bit ADC 80 remains to be $FFF_{hex}$, operation unit 82-2 holds the same output value by the execution of the process in step ST23 shown in FIG. 16.

Subsequently, at the timing when the electrically-charge bias is applied, ON-signal ON switches from "L" to "H".

Selection signal Select of "H" is inputted into output selector 106, and 130-kHz control pulse S60 is immediately outputted from output selector 106. In addition, when ON-signal ON switches from "L" to "H," comparator 88 receives the 8-bit target value of $80_{hex}$ and the highest 10-bit value ($000_{hex}$) of the inverted value created by making inverter 81 invert the value ($80FFF_{hex}$) detected by 12-bit ADC inverter 81. Then, comparator 88 outputs a 3-bit output value of 000b to operation unit 82-1 while satisfying the following condition:

the 10-bit value obtained by adding the lowest 2-bit value 00b to (the 8-bit target value −1) >the highest 10 bits of the output value of inverter 81; and $1FC_{hex} \geq 000_{hex}$.

Operation unit 82-1 updates the value of the 19-bit register to be $64000_{hex}$ by adding the output value $4000_{hex}$ of multiplier 84 to the value $60000_{hex}$ of 19-bit register. As a consequence, control pulse S60 outputted from output selector 106 has a frequency of 125 kHz. From then onwards, operation unit 82-1 updates the value of 19-bit register 101 by adding the output value of multiplier 84 to the value of 19-bit register 101 until the output value of inverter 81 becomes equal to $1FC_{hex}$. The update is performed at a cycle of 140 μsec that is equal to the output-pulse cycle of timer 86. The output value $1FC_{hex}$ of inverter 81 is a 12-bit value of $7F0_{hex}$, and the value detected by 12-bit ADC 80 is a 12-bit value $810_{hex}$. These values are between −1100 V and −1200 V according to FIG. 13.

As a result of the addition performed by operation unit 82-1 on the value of 19-bit register 101, the drive frequency of control pulse S60 becomes lower. The 6-bit value inputted to table register 83-2 increases and, as shown in FIG. 8, the output value of table register 83-2 decreases. In addition, with the lowering of the drive frequency of control pulse S60, the absolute value of high-voltage DC output voltage S75 becomes higher. Consequently, the value detected by 12-bit ADC 80 decreases and the output value of inverter 81 increases. Thereby, the output value of operation unit 82-2 gradually increases from the initial $00_{hex}$ to $01_{hex}$, to $02_{hex}$, to $03_{hex}$, ..., to $0C_{hex}$, to $0D_{hex}$, to $0E_{hex}$, and to $0F_{hex}$. In the meanwhile, the output value of table register 83-1 gradually decreases as shown in FIG. 7.

When 19-bit register 101 is subjected to the addition and update, operation unit 82-1 compares the result of the addition with the 19-bit output value of counter upper-limit-value table 91, and controls the addition and update in a manner such that the result of the addition does not exceed the 19-bit output value of counter upper-limit-value table 91. To put it differently, if the result of the addition exceeds the 19-bit output value of counter upper-limit-value table 91, operation unit 82-1 limits the updated value of 19-bit register 101 to the output value of counter upper-limit-value table 91.

FIG. 17 is a table showing the rising characteristics of DC output voltage S75 in the case where 5-MΩ load 79 is connected to high-voltage power-supply apparatus 70 shown in FIGS. 1 and 2. This 5-MΩ load 79 is implemented by connecting four 1.25-MΩ loads 79C to 79K.

FIG. 18 is a graph showing the rising characteristics of DC output voltage S75 shown in FIG. 17. With the increasing absolute value of DC output voltage S75, the DC output current increases, and the value detected by 8-bit ADC 89 decreases from $FF_{hex}$. Accordingly, the output value of counter upper-limit-value table 91 is updated.

FIGS. 9-1 and 9-2 show the relationship between the input value into, and the output value from, counter upper-limit-value table 91.

FIGS. 10-1 and 10-2 show the relationship between output-current detection signal S76 detected by current detector 76 and the piezoelectric transducer drive frequency (i.e., the frequency of drive pulse S73) expressed by the 19-bit output value of FIGS. 9-1 and 9-2.

In the initial state, the drive lower limit frequency is limited to 113 kHz. As the DC output current increases, the electric current value increases. Thereby, control is performed to shift the drive lower limit frequency to a lower one. The above-mentioned 5-MΩ load 79 is assumed to be the maximum load, and the −1200-V target output voltage is also the maximum output value that is needed for the electrical charging.

Figure 19:
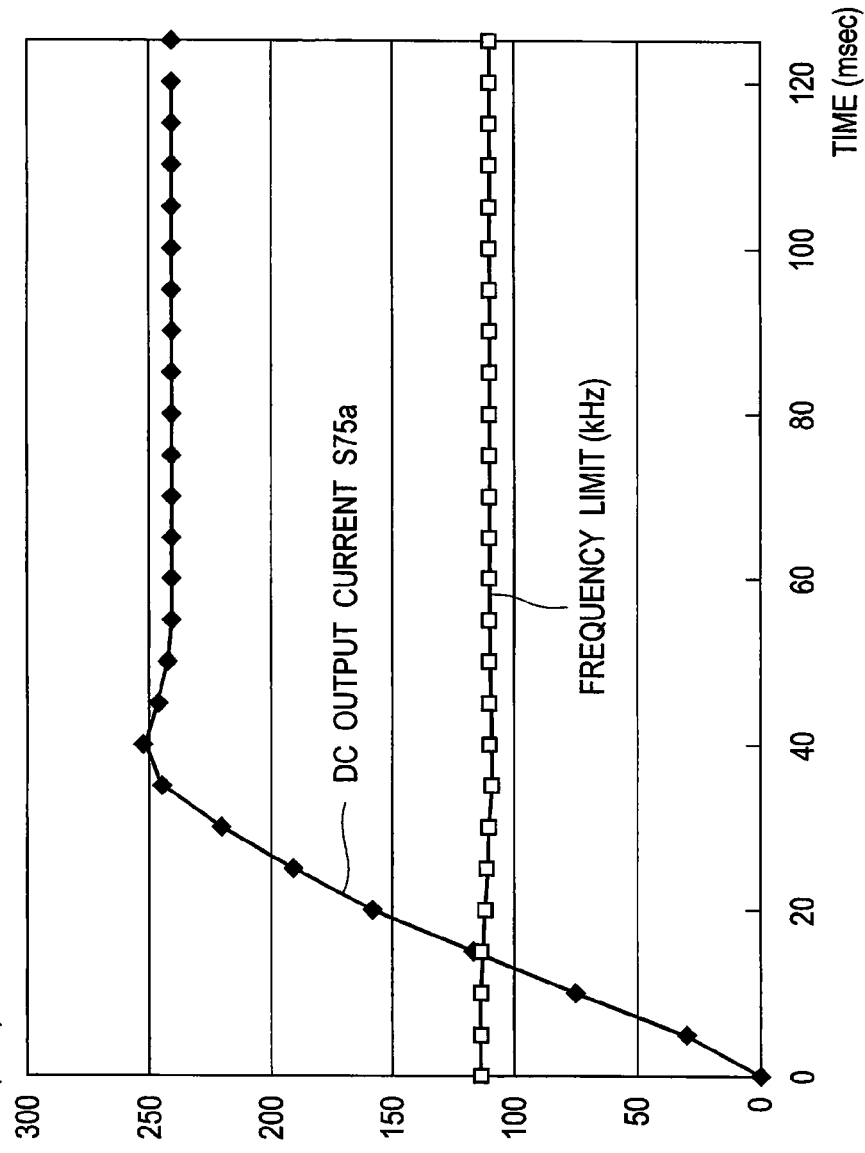

FIG. 19 is a graph that becomes paired with FIG. 18 under the same conditions and shows current characteristics of DC output current S75a.

The graph of FIG. 19 plots the limit values of the drive frequency as changed with the increase in DC output current S75a and the output value of counter upper-limit-value table 91.

As shown in FIG. 18, as DC output voltage S75 approaches −1200 V, the drive-frequency limit and the drive frequency in control pulse S60 come closer to each other. At the time of overshooting beyond the target voltage, the control is performed with the drive-frequency limit, and from then onwards a constant-voltage control is performed. FIG. 17 shows the value.

In FIG. 17, with the addition performed by operation unit 82-1 on 19-bit register 101, DC output voltage S75 once reaches the drive-frequency limit and then exceeds −1200 V. After that, the 3-bit output value of comparator 88 becomes either 011 or 100b, and the value of 19-bit register 101 is subtracted. Eventually, the value of the control frequency is fixed with the value detected by 12-bit ADC 80 ranging from $7FD_{hex}$ to $800_{hex}$, and a constant-voltage control is performed. In the case of an actual charging load, the load always fluctuates. While the value detected by 12-bit ADC 80 is within a range of $7F0_{hex}$ to $810_{hex}$, the increase or the decrease of frequency-division-ratio is done in a step-by-step manner with a 1/1024 difference, so a stable constant-voltage control is carried out without involving output ripples that would otherwise be caused by the control. In addition, even in the event of greater load fluctuations, a stable constant-voltage control is possible because the load fluctuations become smaller with the output value of table register 83-1 approaching the target voltage.

Let us assume that when an abnormality occurs (e.g., when a user sets development units 2K to 2C in wrong positions and contact failure occurs at the contact points for the electrically-charge bias), the output of loads 79C to 79K becomes 120 μA which is one half of 240 μA (60 μA×4) which the loads 79C to 79K output with the maximum load of −1200 V.

With the 240-μA load, the drive frequency of control pulse S60 is 109.1 kHz according to the characteristics shown in FIG. 11, and the drive-frequency limit value becomes 109.23 kHz according to FIG. 10. In this respect, let us assume that loads 79C to 79K are halved instantaneously. As shown in FIG. 11, DC output voltage S75 becomes approximately −1.93kV, and the electric current value becomes 193 μA. Hence, as shown in FIGS. 10-1 and 10-2, the drive frequency of control pulse S60 is instantaneously switched to a drive frequency that is equal to or higher than 110.38 kHz corresponding to 193 μA shown in FIG. 11 in a short time when: current detector 76 converts the 193-μA current value to a voltage value; 8-bit ADC 89 performs AD conversion; counter upper-limit-value table 91 updates the output value; and operation unit 82-1 updates the value of 19-bit register 101 of operation unit 82-1. Consequently, the drive frequency of control pulse S60 is switched to a higher frequency than the resonant frequency of piezoelectric transducer 74, and thus DC output voltage S75 becomes approximately −1.8 kV. Accordingly, a voltage that is 50% larger than the control target voltage is detected by 12-bit ADC 80, the output value of table register 83-1 becomes larger, control is made for the drive frequency to be higher, and constant-voltage control with −1200 V is resumed.

If loads 79C to 79K drop down to a quarter of the original value, DC output voltage S75 becomes approximately −2.5 kV and the electric current becomes 130 μA according to FIG. 11. As a result, the drive frequency lower limit value is limited to 111.80 kHz, and DC output voltage S75 becomes approximately −2.2 kV according to FIG. 10. Hence, as in the above-described case, the drive frequency is raised by the control, and DC output voltage S75 returns to −1200 V.

Finally, if, under the above-described conditions, the load is released, DC output voltage S75 becomes approximately −3.0 kV according to FIG. 11. The current becomes almost 0, which is below 35 μA. For this reason, the drive frequency immediately becomes 113.00 kHz and DC output voltage S75 becomes −2.0 kV. From then onwards, control is similarly made for DC output voltage S75 to −1200 V.

As described above, DC output voltage S75 is always controlled within a frequency range of the resonant frequency of piezoelectric transducer 74 or above. If, for example, a state where a bias is applied with no frequency lower limit set, with the load being maximum, with DC output voltage S75 being −1200 V and with DC output current S75a being 240 μA shifts to a state where the load is released, DC output voltage S75 becomes approximately −2.5 kV as shown in FIG. 11. In this respect, since the absolute value of DC output voltage S75 is larger than the absolute value of the target voltage (=−1200 V), control is made to raise the drive frequency of control pulse S60. As in the above-described case, DC output voltage S75 eventually reaches −1200V, but in this case, DC output voltage S75 changes in the course of a change in the frequency characteristics from 109 kHz to 114 kHz of the case with no load, which is plotted in FIG. 14. Hence, when the drive frequency changes beyond the resonant frequency, DC output voltage D75 of as high as −12 kV occurs. This brings about the occurrence of an abnormal discharge, and the destruction of rectifier diodes 75a, 75b and capacitor 75c caused by the higher voltage than the breakdown voltage. In the first embodiment, the drive-frequency range of control pulse S60 is limited in accordance with the load current, so that the risk of the abnormal discharge and that of the destruction can be avoided.

High-voltage DC output voltage S75 switches ON-signal ON from "H" to "L" at the same time as the motor is stopped to finish the idling rotations accompanied by the printing operation or the initial actions. Hence, drive pulse S73 of piezoelectric transducer 74 is halted and the high-voltage output is also switched off. At this time, in the circuits in high-voltage controller 60 shown in FIG. 5, the output value of comparator 88 becomes 100b upon receiving ON-signal ON of "L"; and operation unit 82-1 decreases the value of 19-bit register 101 to the value of counter lower-limit-value table 87 and the highest 9 bits of 19-bit register 101. Hence, the initial frequency-division ratio of $60000_{hex}$ is recovered.

From then onwards, when electrically-charge bias is applied, ON-signal ON is switched back to "H." In addition, when electrically-charge bias is changed, data DATA of the 8-bit target value is changed.

Modifications of First Embodiment

It is possible to modify the first embodiment and adopt the following modifications (a) to (c).

(a) In the first embodiment, the drive-frequency limit of control pulse S60 is accomplished by counter upper-limit-value table 91. However, an operational circuit may calculate the drive-frequency limit by using a formula. In addition, the first embodiment is applied to the case where the electrically-charge bias is a negative bias. However, the first embodiment may also be applied to a case where the electrically-charge bias is a positive bias.

(b) The output-voltage control range is from −800 to −1200V, and the output-current range is from 0 μA to 255 μA in the first embodiment. These are only examples, and these ranges are not the only possible ones. The output-current range can easily be changed, for example, by altering the constant of inductor 73d in piezoelectric transducer driver circuit 73, or by replacing inductor 73d with an auto transformer. Due to these, the drive-frequency range of control pulse S60 also changes. Hence, the first embodiment can be implemented with some other circuits that can be adapted to such changes. In addition, for the sake of simplifying the explanation, the description of the first embodiment is provided with the assumption of the step-by-step change of load 79. However, the first embodiment may be adapted to the load fluctuations caused by the varying state of photosensitive drums 32K to 32C or to the load fluctuations that occur in the application of the first embodiment to other high-voltage bias sources.

(c) Although current detector 76 to detect a load-current change caused by the load release or the use or non-use of development units 2K to 2C is made by a circuit, current detector 76 may be implemented using a sensor, and configured to detect the connection and disconnection of development units 2K to 2C by the sensor; and detect a change in the load-current range in response to the detection by the sensor. Current detector 76 can be implemented not only by using an actual current-detector circuit, but also by some other methods, such as detecting the presence or absence of an object that can serve as load 79.

Effects of First Embodiment

The first embodiment has the following effects (1) to (3).

(1) Current detector 76 detects the load current, and the frequency range of control pulse S60 is varied in accordance with the value of output-current detection signal S76. Hence, the control range by the load current is varied. Accordingly, even with such a heavy load that alters the Q factor, high-voltage power-supply apparatus 70 equipped with piezoelectric transducer 74 can be controlled in a stable manner.

(2) Even with a rapid change in load 79, the frequency range of control pulse S60 is changed immediately. For this reason, within a range of the resonant frequency of piezoelectric transducer 74 or above, the output is always controlled in order to be the target voltage. In addition, within the range that allows the necessary electric current to be taken out, necessary DC output voltage S75 can be obtained even when the frequency characteristics of piezoelectric transducer 74 changes.

(3) Even in an event of abnormality such as the load release, no such high voltage as several kilovolts occurs, and it is possible to control the output so that the target voltage can be achieved immediately.

Second Embodiment

The configurations of an image formation apparatus and a control circuit of a second embodiment of the invention are the same as those of image formation apparatus 1 shown in FIG. 3 and the control circuit shown in FIG. 4 both concerning the first embodiment. The configuration of a high-voltage power-supply apparatus of the second embodiment is different from that of high-voltage power-supply apparatus 70 of the first embodiment which are shown in FIGS. 1 and 2. Accordingly, a description is given below of the high-voltage power-supply apparatus of the second embodiment.

(Configuration of High-Voltage Power-Supply Apparatus)

Figure 20:
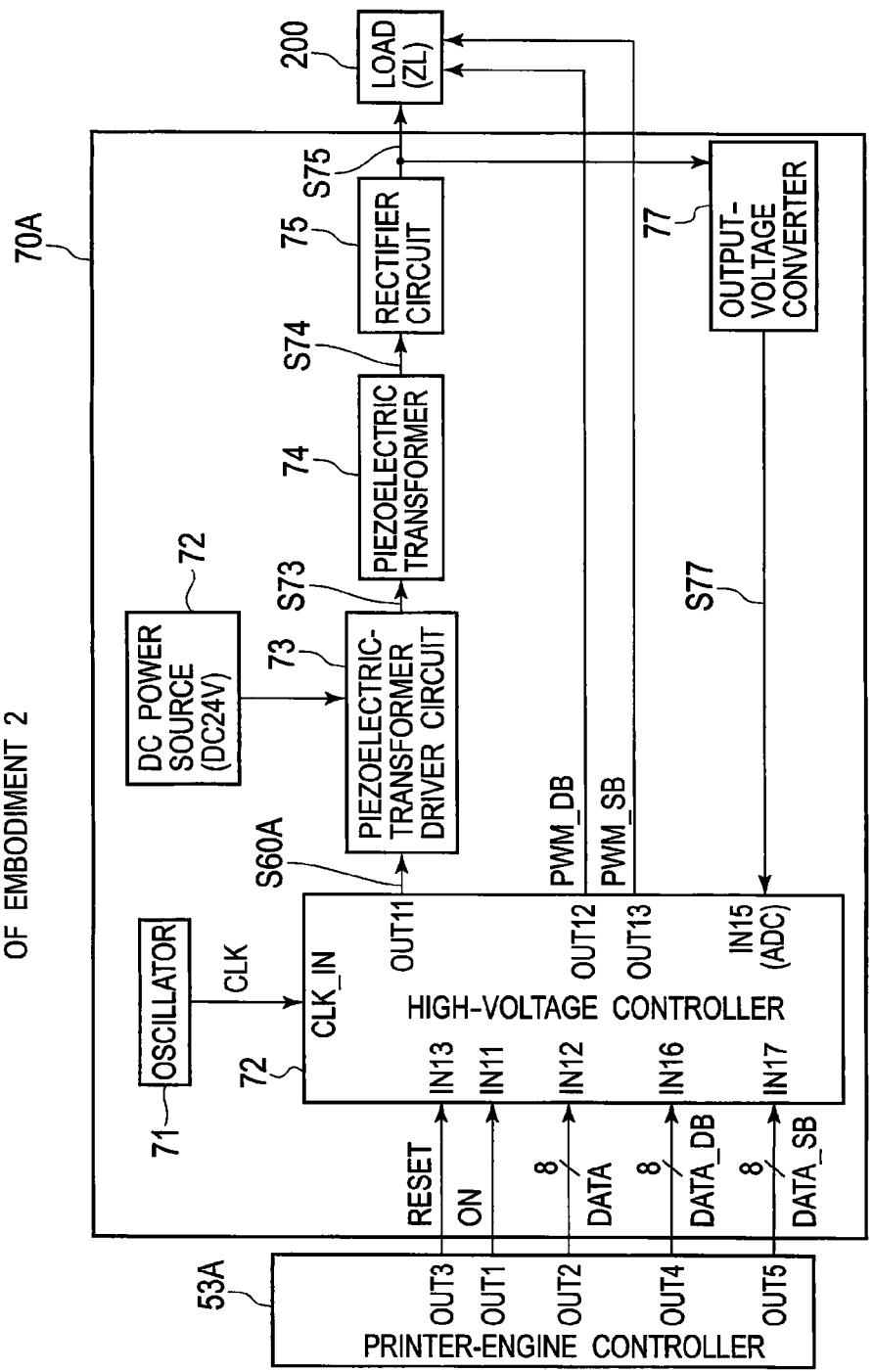
FIG. 20 is a block diagram schematically showing the configuration of a high-voltage power-supply apparatus according to a second embodiment of the invention.

FIG. 20 is a block diagram schematically showing the configuration of the high-voltage power-supply apparatus according to the second embodiment of the invention. Of all the elements included in the high-voltage power-supply apparatus of the second embodiment, those that are identical to the elements shown in FIG. 1 showing high-voltage power-supply apparatus 70 of the first embodiment are denoted by the same reference numerals as are used in the first embodiment.

High-voltage power-supply apparatus 70A of the second embodiment is connected to printer-engine controller 53A, which has a different configuration from the configuration of printer-engine controller 53 of the first embodiment. High-voltage power-supply apparatus 70A is provided with high-voltage controller 60A whose configuration is different from the configuration of high-voltage controller 60 of the first embodiment. In addition, current detector 76 of the first embodiment is removed from high-voltage power-supply apparatus 70A. Load (ZL) 200 that is different from load (ZL) of the first embodiment is connected to high-voltage power-supply apparatus 70A. The rest of the configuration of high-voltage power-supply apparatus 70A is similar to that of the high-voltage power-supply apparatus of the first embodiment.

Printer-engine controller 53A includes: output port OUT1 through which ON-signal ON is outputted; output port OUT2 through which data DATA of the target voltage is outputted; output port OUT3 through which reset signal RESET is outputted; output port OUT4 through which 8-bit data DATA_DB, corresponding to the bias to be applied to development rollers 34K to 34C shown in FIG. 3, are outputted; and output port OUT5 through which 8-bit data OUT_SB, corresponding to the bias to be applied to toner-supply rollers 33K to 33C shown in FIG. 1, are outputted.

High-voltage controller 60A includes: input port CLK_IN through which clock CLK is inputted; input port IN11 through which ON-signal ON is inputted; input port IN12 through which data DATA of the target voltage are inputted; input port IN13 through which reset signal RESET is inputted; input port IN15 through which output-voltage detection signal S77 is inputted; input port IN16 through which data DATA_DB are inputted; input port IN17 through which data DATA_SB are inputted; output port OUT11 through which control pulse S60A with a variable drive frequency is outputted; output port OUT12 through which a pulse-width modulation pulse (hereinafter, referred to as "pulse PWM_DB") with an on-duty cycle in accordance with data DATA_DB is outputted; and output port OUT13 through which a pulse-width modulation pulse (hereinafter, referred to as the "pulse PWM_SB") with an on-duty cycle in accordance with data DATA_SB is outputted.

Load 200 connected to high-voltage power-supply apparatus 70A is a circuit configured to generate a bias to be applied to the development rollers and a bias to be applied to the toner-supply rollers. Load 200 varies depending upon the output bias voltage.

Figure 21:
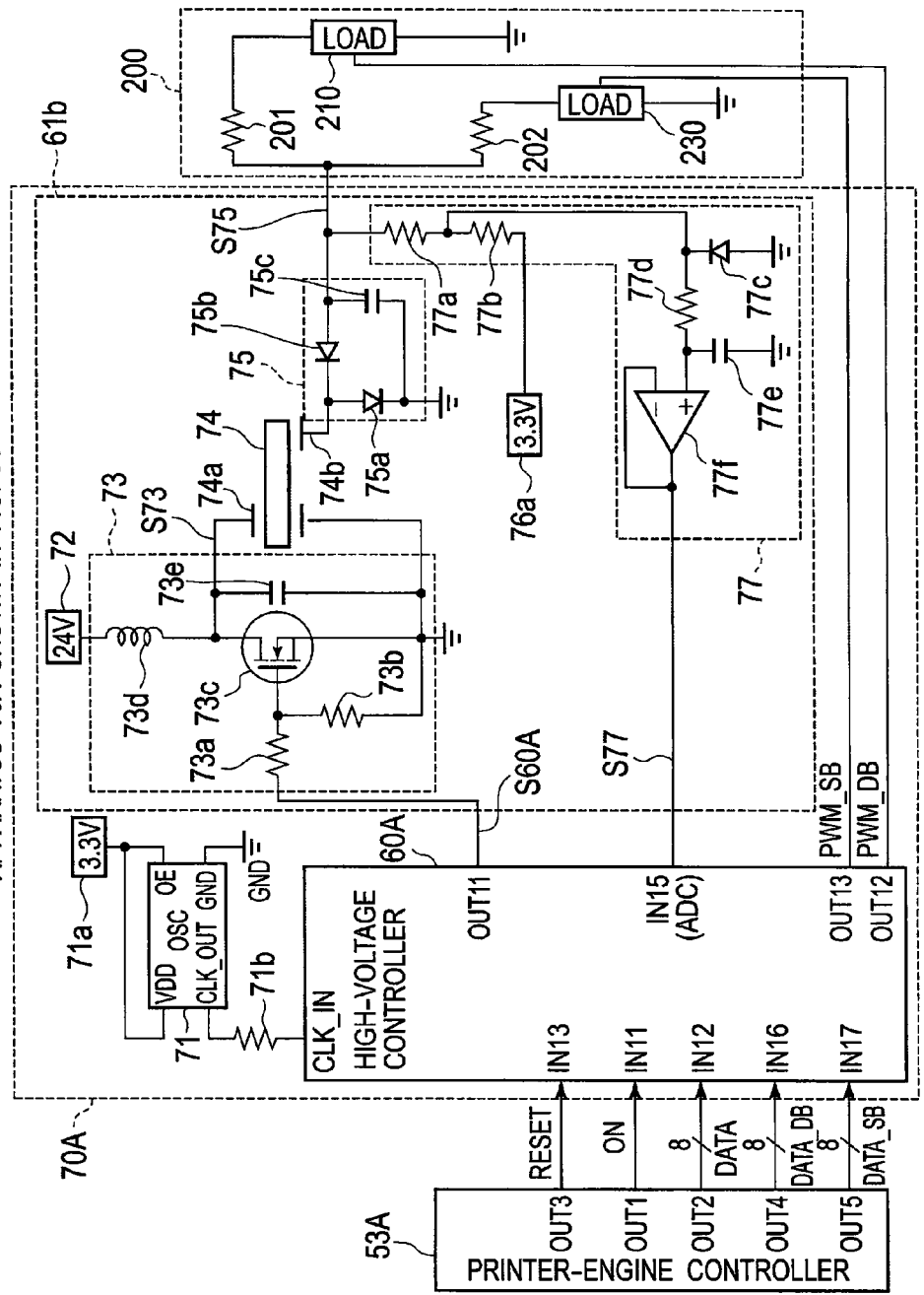
FIG. 21 is a circuit diagram showing an example of a detailed configuration of high-voltage power-supply apparatus 70A shown in FIG. 20.

FIG. 21 is a circuit diagram showing an example of a detailed configuration of high-voltage power-supply apparatus 70A shown in FIG. 20. Of all the elements included in the high-voltage power-supply apparatus 70A, those that are identical to the ones included in high-voltage power-supply apparatus 70 of the first embodiment shown in FIG. 2 are denoted by the same reference numerals as are used in the first embodiment.

High-voltage power-supply apparatus 70A includes high-voltage controller 60A and electrically-charging high-voltage circuit 61b whose configurations are different respectively from the configurations of high-voltage controller 60 and electrically-charging high-voltage circuit 61a of the first embodiment.

High-voltage controller 60A has a function of outputting 48.8-kHz pulse PWM_DB through output port OUT12 and 48.8-kHz pulse PWM_SB through output port 13. Pulse PWM_DB and pulse PWM_SB are generated by dividing, by 1024, the frequency of 50-MHz clock CLK with a 20-nsec period that is inputted through the input port CLK_IN. The duty cycle of pulse PWM_DB and the duty cycle of pulse PWM_SB are determined by 8-bit data DATA_DB inputted through input port IN16 and by 8-bit data DATA_SB inputted through input port IN 17, respectively. A period "H" representing a period indicated by a 10-bit value obtained by adding a value of 00b to the lowest 2 bits of the inputted 8-bit value is outputted. For example, if the 8-bit input value is $80_{hex}$, the period of $200_{hex}$, that is, a period of 512 cycles, is the "H" period. Because the number of cycles in a period is 1024, the duty cycle becomes 50%.

Electrically-charging high-voltage circuit 61b has no current detector 76 of the first embodiment, and an end of resistor 77b included in output-voltage converter 77 is connected to 3.3-V DC power source 76a, instead of to the "−" input terminal of operational amplifier 76b as in the first embodiment.

Load 200 is a circuit configured to generate a bias to be applied to development rollers and a bias to be applied to toner-supply rollers. Load 210 of development bias circuit and load 230 of supply bias circuit are connected to each other via 10-MΩ resistor 201 and 10-MΩ resistor 202.

Figure 22:
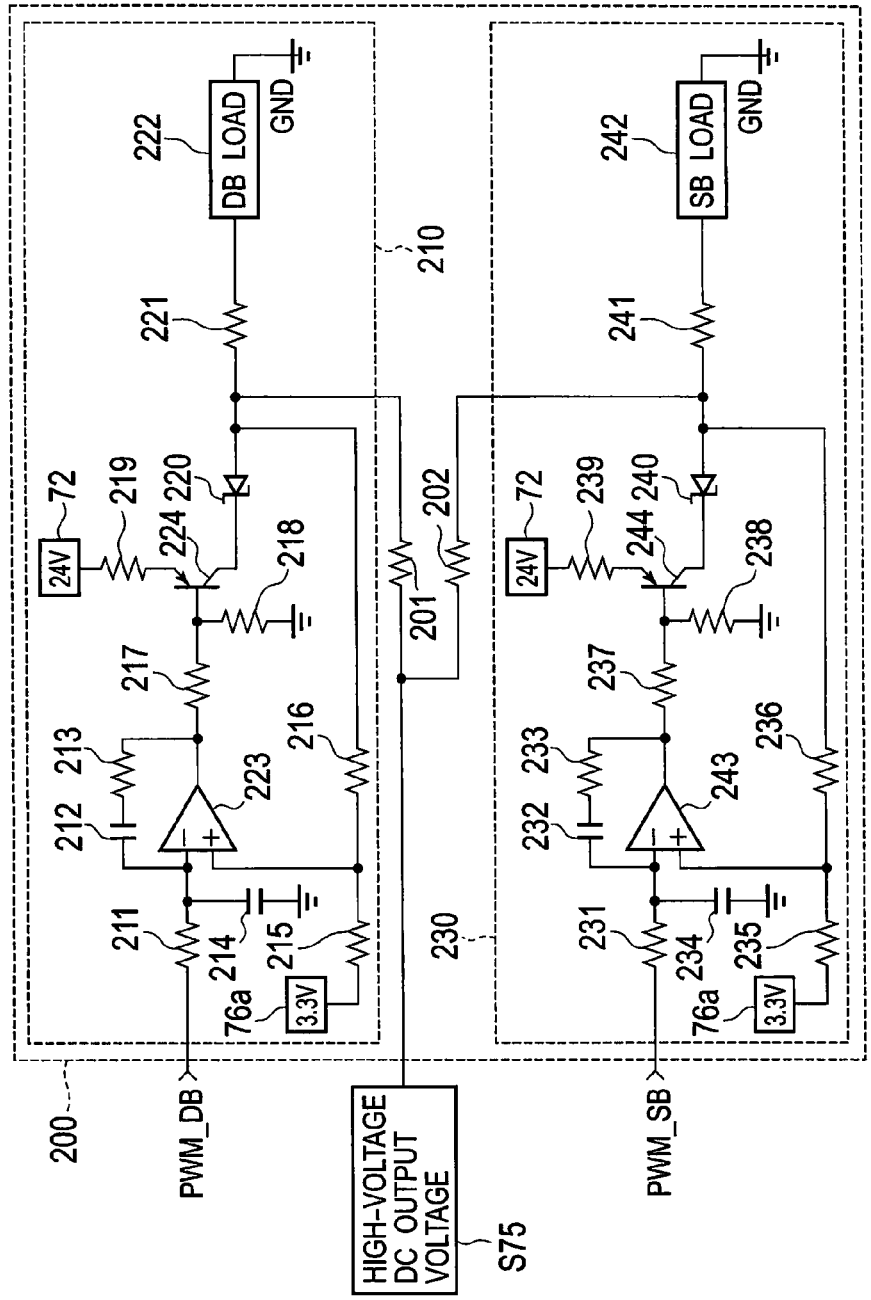
FIG. 22 is a circuit diagram showing an example of the configuration of load 200 shown in FIG. 21.

FIG. 22 is a circuit diagram showing an example of the configuration of load 200 shown in FIG. 21.

In load 200, two loads with identical circuit configurations—i.e., load 210 of development bias circuit for a single channel and load 230 of supply bias circuit for a single channel—are arranged in parallel to each other.

Load 210 of the development bias circuit includes: resistor 211 and capacitor 214 into which pulse PWM_DB is inputted; 760-kΩ resistor 215 connected to 3.3-V DC power source 76a; operational amplifier 223 connected to 100-MΩ resistor 216 and a 24-V DC power source which is not illustrated; capacitor 212 and resistor 213 for phase adjustment connected between the input terminal and the output terminal of operational amplifier 223; resistors 217, 218 connected to the output terminal of operational amplifier 223; PNP transistor 224 whose base is connected to resistors 217, 218; 24-V DC power source 72 connected to the emitter of PNP transistor 224 via resistor 219; 75-V zener diode 220 whose cathode is connected to the collector of PNP transistor 224; and DB load 222, which is development rollers 34K to 34C, connected to the anode of zener diode 220 via resistor 221. High-voltage DC output voltage S75 is inputted into the anode of zener diode 220 via 10-MΩ resister 201.

Load 230 of the supply bias circuit has the same circuit configuration as does load 210 of the development bias circuit. Load 230 includes: resistor 231 and capacitor 234 into which pulse PWM_SB is inputted; 760-kΩ resistor 235 connected to 3.3-V DC power source 76a; operational amplifier 243 connected to 100-MΩ resistor 236 and a 24-V DC power source which is not illustrated; capacitor 232 and resistor 233 for phase adjustment both of which are connected between the input and output terminals of operational amplifier 243; resistors 237, 238 connected to the output terminal of operational amplifier 243; PNP transistor 244 whose base is connected to resistors 237, 238; 24-V DC power source 72 connected to the emitter of PNP transistor 244 via resistor 239; 75-V zener diode 240 whose cathode is connected to the collector of PNP transistor 244; and SB load 242, which is toner-supply rollers 33K to 33C, connected to the anode of zener diode 240 via resistance 241. High-voltage DC output voltage S75 is inputted into the anode of zener diode 240 via 10-MΩ resistor 202.

In the second embodiment, load 210 of the development bias circuit for a single channel and load 230 of supply bias circuit for a single channel are arranged in parallel to each other. In a case of the four colors, four such loads are arranged in parallel to one another. Note that the piezoelectric transducer driver circuit of the second embodiment has the same configuration as that of the first embodiment, so the piezoelectric transducer driver circuit of the second embodiment has the configuration shown in FIG. 22. However, it is possible to covers 8 channels, inclusive of channels for the four color development biases and channels for the four color supply biases, with the single high-voltage DC output voltage S75 by making the drive capacities of those biases higher than the drive capacities of the electrically-charge biases.

(Configuration of High-Voltage Controller in High-Voltage Power-Supply Apparatus)

Figure 23:
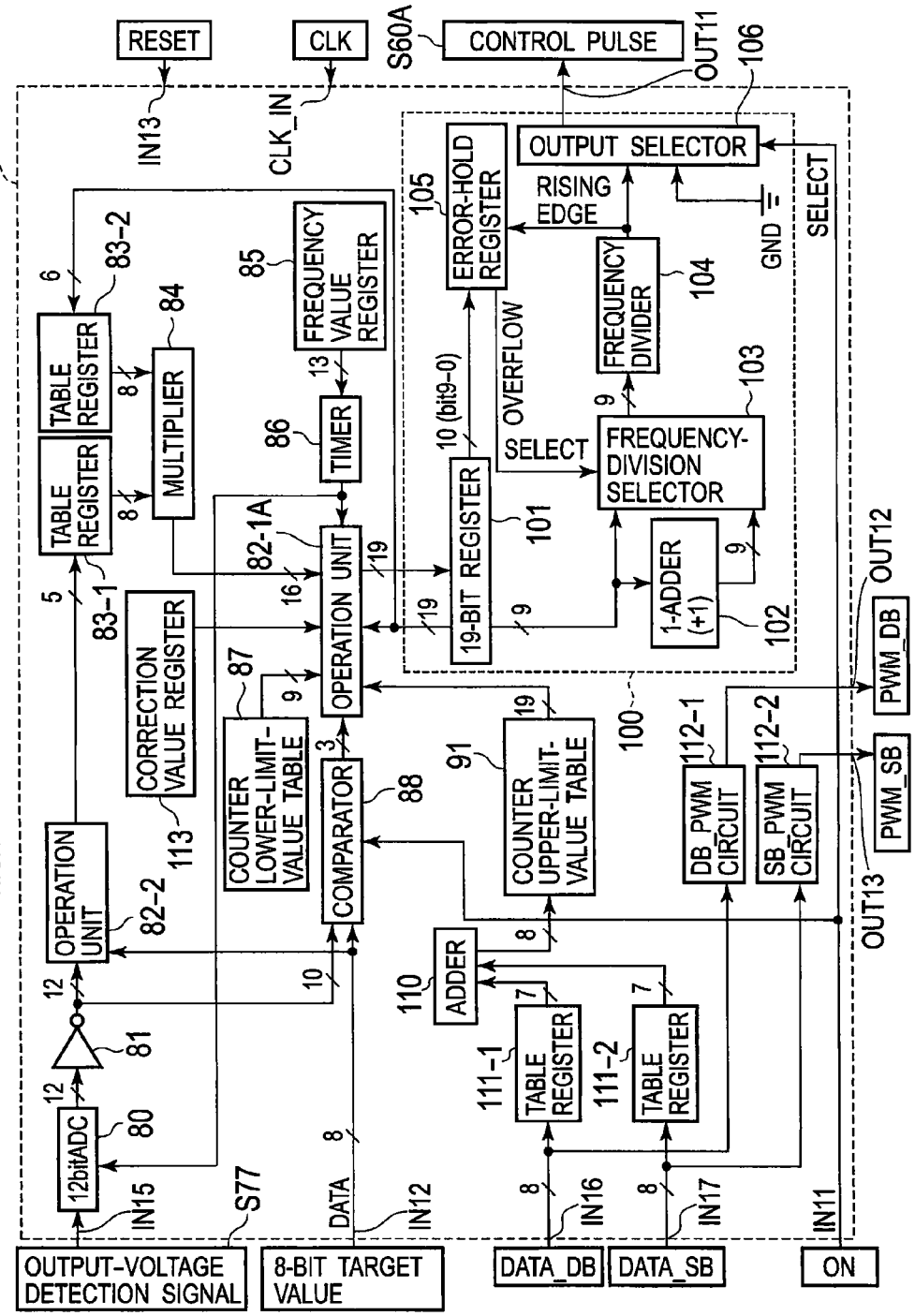
FIG. 23 is a configuration diagram showing high-voltage controller 60A shown in FIG. 21.

FIG. 23 is a configuration diagram showing high-voltage controller 60A shown in FIG. 21. Of all the elements of high-voltage controller 60A, those elements that are identical to the ones shown in FIG. 5 showing high-voltage controller 60 of the first embodiment are denoted by the same reference numerals as are used in FIG. 5.

High-voltage controller 60A of the second embodiment includes: operation unit 82-1A, whose configuration is different from the configuration of operation unit 82-1, in place of operation unit 82-1 provided in high-voltage controller 60 of the first embodiment; and correction unit (correction-value register) 113 configured to set a correction value to correct frequency-division ratio that is to be inputted into frequency divider 104. In addition, in place of 8-bit ADC 89 and inverter 90 in high-voltage controller 60 of the first embodiment, high-voltage controller 60A includes: adder 110; memory unit (e.g., two table registers) 111-1, 111-2 configured to hold, as current-detection results, values of the load current corresponding to load-operation conditions; DB_PWM circuit 112-1; and SB_PWM circuit 112-2.

Input ports IN16, IN17, adder 110, and table registers 111-1, 111-2 constitute a current detector to detect the load current and to output the current-detection result.

Table register 111-1 is a register configured to output, to adder 110, a 7-bit value corresponding to 8-bit data DATA_DB inputted through input port IN16. Table register 111-2 is a register configured to output, to adder 110, a 7-bit value corresponding to 8-bit data DATA_SB inputted through input port IN17. Adder 110 is configured to output, to counter upper-limit-value table 91, an 8-bit addition value obtained by adding the 7-bit output value of table register 111-1 and the 7-bit output value of table register 111-2 together. DB_PWM circuit 112-1 is a circuit configured to output, through output port OUT12, 48.8-kHz pulse PWM_DB corresponding to 8-bit data DATA_DB inputted through input port IN16. 8-bit data DATA_DB of $40_{hex}$ corresponds to 25%; $80_{hex}$ to 50%; and $C0_{hex}$ to 75% on-duty cycle. Likewise, SB_PWM circuit 112-2 is a circuit configured to output, to output port OUT13, 48.8-kHz pulse PWM_SB corresponding to 8-bit data DATA_SB inputted through input port IN 17.

The rest of the configuration of high-voltage controller 60A of the second embodiment is identical to that of high-voltage controller 60 of the first embodiment.

Operations of Second Embodiment

FIGS. 24-1 and 24-2 are tables showing the relationship between values of data DATA_DB and data DATA_SB inputted into high-voltage controller 60A shown in FIG. 22, and the biases to be applied to DB load 222 and SB load 242 shown in FIG. 22 (i.e., the relationship between the PWM setup value and DC output voltage S75). FIGS. 25-1 and 25-2 are tables showing output values corresponding to the setup values in table registers 111-1, 111-2 shown in FIG. 23.

In the second embodiment, image formation apparatus 1 shown in FIG. 3 and controller circuit shown in FIG. 4 are operated in a similar manner to those in the first embodiment. Referring to FIGS. 24-1, 24-2, 25-1, and 25-2, the operations of the portions that are different from the first embodiment are described below.

With regard to printer-engine controller 53A and high-voltage power-supply apparatus 70A shown in FIG. 20, printer-engine controller 53A sets 8-bit data DATA of the target voltage at a value corresponding to a DC output voltage of −1000 V (i.e., $6A_{hex}$ in FIG. 13); and subsequently, printer-engine controller 53A outputs, to high-voltage controller 60A, 8-bit data DATA_DB, DATA_SB corresponding to the DC output voltage of −1000V, respectively, through output ports OUT4, OUT5. At the time when ON-signal ON that is inputted from printer-engine controller 53A becomes "H," high-voltage controller 60A outputs control pulse 560A through output port OUT11, and receives a feedback of output-voltage detection signal S77 outputted from output-voltage converter 77. By a similar control to the one performed in the first embodiment, high-voltage controller 60A makes rectifier circuit 75 output a DC output voltage S75 of −1000 V. In addition, high-voltage controller 60A outputs, through output ports OUT12, OUT13, pulses PWM_DB, PWM_SB corresponding to inputted 8-bit data DATA_DB, DATA_SB, respectively. Thereby, high-voltage controller 60A supplies pulses PWM_DB, PWM_SB to the development bias circuit and to the supply bias circuit which are load 200.

In FIG. 21, high-voltage controller 60A outputs, through output port OUT13, pulse PWM_SB to control the supply-bias output value, and supplies pulse PWM_SB to the supply bias circuit which is load 230. In addition, high-voltage controller 60A outputs, through output port OUT12, pulse PWM_DB to control the development-bias output value, and supplies pulse PWM_DB to the development bias circuit which is load 210.

Next, description is given below of the operations of the development bias circuit (load 210) and the operations of supply bias circuit (load 230) by referring to FIG. 22. Note that because load 210 of development bias circuit and load 230 of the supply bias circuit have the same configuration, the following description focuses only on the operations of load 210 of the development bias circuit.

Pulse PWM_DB inputted from high-voltage controller 60A is a pulse-width modulation signal with 3.3 V at the "H" level and 0.0 V at the "L" level. Once inputted, pulse PWM_DB is smoothed by resistor 211 and capacitor 214, and is then inputted into the "−" input terminal of operational amplifier 223. Once passed through 10-MΩ resistor 201, high-voltage DC output voltage S75 is divided into 100-MΩ resistor 216 and 760-kΩ resistor 215, and is then inputted into the "+" input terminal of operational amplifier 223. The voltage of −1000 V, which is the high-voltage DC output voltage S75, drops due to the value of the electric current that flows through 10-MΩ resistor 201. The electric current that flows through resistor 210 is controlled via zener diode 220 by PNP transistor 224.

Operational amplifier 223 controls the base current of PNP transistor 224 in a manner such that the voltages obtained by the division performed by resistor 215 and resistor 216 can be equal to the level of pulse PWM_DB smoothed by resistor 211 and capacitor 214. DC output voltage corresponding to inputted pulse PWM_DB is applied, via resistor 221, to DB load 222 which is development rollers 34K to 34C. Zener diode 220 limits the output value to clamp the output voltage at −75V. As a consequence, the development bias circuit obtains an output voltage ranging from −75 V to −440 V depending on the pulse width of inputted pulse PWM_DB.

Similar operations to those of load 210 in the development bias circuit are performed by load 230 in the supply bias circuit.

FIGS. 24-1 and 24-2 show the relationship between the values of data DATA_DB, DATA_SB inputted into high-voltage controller 60A and the biases to be applied to DB load 222 and SB load 242. Images are formed with the output values of the development bias and supply bias varied depending upon the density of the output image, environmental conditions, and the like. High-voltage DC output voltage S75 is controlled at a constant voltage of −1000 V, as in the case of the first embodiment.

In FIG. 23, in a case where the development bias is −210 V and the supply bias is −270 V, an 8-bit value $85_{hex}$ of data DATA_DB is outputted from printer-engine controller 53A to high-voltage controller 60A. High-voltage controller 60A outputs, through output port OUT12, pulse PWM_DB with a cycle of 1024×20 nsec (=20.48 μsec) and with the "H" time of $85×4_{hex}$ in 10-bit value, or 133×4×20 nsec (=10.64 μsec) in decimal count. Likewise, high-voltage controller 60A outputs 8-bit value $62_{hex}$ of data DATA_SB, and outputs, through output port OUT13, pulse PWM_SB with the same cycle and an "H" time of 7.84 μsec.

FIGS. 25-1 and 25-2 show the values inputted into and those outputted from table registers 111-1, 111-2 corresponding to the load current of the circuit with different set-ups. For example, when the output voltage to SB load 242 is −270 V, the load current is an electric current of $57_{hex}$, i.e., 87 μA in decimal count, corresponding to a setup value of $62_{hex}$. When the output voltage to DB load 222 is −210 V, the load current is an electric current of $5D_{hex}$, i.e., 93 μA in decimal count, corresponding to a setup value of $85_{hex}$. Each of the above-mentioned values of the load current is obtained by adding a value of 16 μA as the current flowing through DB load 222 and SB load 242 to the load currents depending on the operations of the circuits. Table registers 111-1, 111-2 shown in FIGS. 25-1 and 25-2 have the same configurations. The sum of the two load currents is calculated by adder 110, and is outputted to counter upper-limit-value table 91.

Because of the operations described thus far, the load reduces to almost half and the output voltage is ready to rise to −1900 V momentarily, for example, when the conditions for the DB load and the SB load are changed to an 8-bit setup value of $00_{hex}$ (representing the minimum load shown in FIG. 24-1 and FIG. 24-2) and an output voltage of −440 V from a 8-bit setup value of $FF_{hex}$ (representing the maximum load shown in FIGS. 24-1 and FIG. 24-2) and an output voltage of −75 V, that is to say, the drive frequency with a load current of 216 μA which is approximately 110 kHz according to FIG. 12 and an output value of −1000 V. Because, however, the load current is attenuated more quickly than the voltage rise, the limit value is switched to a value equal to 112 kHz or higher corresponding to the approximately halved current value, and a constant-voltage control at −1000 V is restarted in a short period of time.

Modifications of Second Embodiment

In the second embodiment, single piezoelectric transducer 74 and single piezoelectric transducer driver circuit 73 are used for each channel of load 210 of the development bias circuit and for each channel of load 230 of the supply bias circuit, so that four piezoelectric transducers 74 and four piezoelectric transducer driver circuits 73 are used for the color image formation apparatus 1 as a whole. However, this is not the only possible configuration. For example, if an auto transformer or the like are used for the primary side of piezoelectric transducer driver circuit 73 to enhance the output capacity, a modified configuration capable of supplying biases to a total of 8 circuits—four development bias circuits for the four colors and four supply bias circuits for the four colors—can be easily implemented with a single piezoelectric transducer 74 and a single piezoelectric transducer driver circuit 73.

Effects of Second Embodiment

In the second embodiment, high-voltage controller 60A outputs and supplies pulse PWM_DB and pulse PWM_SB to load 200. For this reason, even if piezoelectric transducer 74 is used without current detector 76 that is employed in the first embodiment while the load is so heavy that fluctuations in the frequency characteristics occur, the drive frequency of control pulse S60A can always be controlled within a range where the drive frequency is higher than the resonant frequency of piezoelectric transducer 74.

Other Modifications

The invention is not limited to the first embodiment and the second embodiment. Other modifications such as ones described below can be made possible.

In the description given in the first and second embodiments, high-voltage power-supply apparatuses 70, 70A for electrically charging and for development are the high-voltage power-supply apparatuses in the tandem-type color image formation apparatus 1. The invention is applicable not only to color image formation apparatuses but also to monochrome image formation apparatuses or the like. In addition, the invention is also applicable to image formation apparatuses of various other types such as multi-function printers. In addition, high-voltage power-supply apparatuses 70, 70A can be used as bias sources for purposes other than electrically charging or development.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:
1. A high-voltage power-supply apparatus comprising:
a controller configured to output a control signal containing a pulse with a variable drive frequency;

a switching unit configured to be switched by the control signal and output a drive signal;

a piezoelectric transducer having a predetermined resonant frequency, and configured to be driven by the drive signal and output a high-voltage output voltage;

a current detector configured to detect an electric current of a load connected to an output side of the piezoelectric transducer and output a current-detection result; and a lower-limit-value setup unit configured to set a frequency lower limit value for the drive frequency of the controller, wherein the controller is configured to vary the frequency lower limit value in accordance with the current-detection result.

2. The high-voltage power-supply apparatus according to claim 1, wherein the controller includes:

a frequency division unit configured to receive a frequency-division ratio value and divide a frequency of a clock signal based on the frequency-division ratio value;

a frequency-division-ratio value setup unit configured to set the frequency-division ratio value and give the frequency-division ratio value to the frequency division unit; and an upper-limit-value setup unit configured to set a frequency-division ratio upper limit value for the frequency-division-ratio value of the frequency-division-ratio value setup unit, wherein the controller variably controls the frequency-division ratio value within a range of the frequency-division ratio upper limit value or below, while varying the frequency-division ratio upper limit value of the upper-limit-value setup unit in accordance with the current-detection result.

3. The high-voltage power-supply apparatus according to claim 1, wherein the controller is configured to perform constant-voltage control to keep the output voltage of the piezoelectric transducer constant.

4. The high-voltage power-supply apparatus according to claim 1, wherein the frequency lower limit value set by the lower-limit-value setup unit is equal to or higher than the resonant frequency with the load.

5. The high-voltage power-supply apparatus according to claim 1, wherein the current detector is configured to convert a current of the load to a voltage, and to output a digital value of the current-detection result.

6. The high-voltage power-supply apparatus according to claim 1, wherein the current detector is configured to hold in a memory unit, as the current-detection result, a load-current value corresponding to a load-operation condition.

7. The high-voltage power-supply apparatus according to claim 1, wherein the controller is configured, when the current-detection result is smaller than a threshold, to set the frequency lower limit value of the lower-limit-value setup unit at a predetermined fixed value.

8. The high-voltage power-supply apparatus according to claim 1, wherein the controller is configured, when the current-detection result is a detection result of a case with no load, to immediately makes the drive frequency equal to or higher than the resonant frequency under a condition without any load.

9. The high-voltage power-supply apparatus according to claim 2, wherein the frequency division unit divides the frequency of the clock signal by binarizing the inputted frequency-division ratio value.

10. The high-voltage power-supply apparatus according to claim 2, wherein the controller includes a correction unit configured to set a correction value for correcting the frequency-division ratio value to be inputted into the frequency division unit, and the controller is configured to correct variations of the piezoelectric transducer by adding or subtracting the correction value to or from a frequency set-up value of the drive frequency.

11. An image formation apparatus for forming an image on a print medium with a high output voltage, comprising the high-voltage power-supply apparatus for outputting the high-voltage output voltage includes:

a controller configured to output a control signal containing a pulse with a variable drive frequency;

a switching unit configured to be switched by the control signal and output a drive signal;

a piezoelectric transducer having a predetermined resonant frequency, and configured to be driven by the drive signal and output a high-voltage output voltage;

a current detector configured to detect an electric current of a load connected to an output side of the piezoelectric transducer and output a current-detection result; and a lower-limit-value setup unit configured to set a frequency lower limit value for the drive frequency of the controller, wherein the controller is configured to make the frequency lower limit value variable in accordance with the current-detection result.

12. An image formation apparatus to form an image on a print medium, comprising the high-voltage power-supply apparatus according to claim 1.

13. The image formation apparatus according to claim 12, further comprising:

a development unit configured to form a developer image; and an image-transfer unit configured to transfer the developer image to a medium, wherein the development unit is driven by the high-voltage output voltage outputted from the high-voltage power-supply apparatus.

14. The image formation apparatus according to claim 12, further comprising:

a development unit configured to form a developer image; and an image-transfer unit configured to transfer the developer image to a medium, wherein the image-transfer unit is driven by the high-voltage output voltage outputted from the high-voltage power-supply apparatus.

* * * * *